US010396879B2

(12) United States Patent
Wu

(10) Patent No.: US 10,396,879 B2
(45) Date of Patent: Aug. 27, 2019

(54) METHOD AND DEVICE IN UE AND BASE STATION USED FOR WIRELESS COMMUNICATION

(71) Applicant: Shanghai Langbo Communication Technology Company Limited, Shanghai (CN)

(72) Inventor: Ke-ying Wu, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 16/122,867

(22) Filed: Sep. 5, 2018

(65) Prior Publication Data

US 2019/0074888 A1   Mar. 7, 2019

(30) Foreign Application Priority Data

Sep. 7, 2017   (CN) .......................... 2017 1 0798966

(51) Int. Cl.
| | |
|---|---|
| *H04K 1/10* | (2006.01) |
| *H04L 27/28* | (2006.01) |
| *H04B 7/06* | (2006.01) |
| *H04B 17/309* | (2015.01) |
| *H04B 17/10* | (2015.01) |
| *H04B 7/0408* | (2017.01) |

(52) U.S. Cl.
CPC ......... *H04B 7/0639* (2013.01); *H04B 7/0408* (2013.01); *H04B 7/0634* (2013.01); *H04B 17/102* (2015.01); *H04B 17/309* (2015.01); *H04B 7/0695* (2013.01)

(58) Field of Classification Search
CPC .. H04B 7/0639; H04B 7/0634; H04B 17/309; H04B 17/102; H04B 7/0408; H04B 7/0695; H04B 7/0628; H04B 7/04; H04B 7/043; H04W 72/042
USPC ................................. 375/260, 219, 220, 346
See application file for complete search history.

(56) References Cited

U.S. PATENT DOCUMENTS

| | | | | |
|---|---|---|---|---|
| 2013/0286960 | A1* | 10/2013 | Li ........................ | H04W 72/042 370/329 |
| 2015/0236774 | A1* | 8/2015 | Son ...................... | H04B 7/0628 375/267 |
| 2017/0346539 | A1* | 11/2017 | Islam .................... | H04B 7/043 |

(Continued)

*Primary Examiner* — Phuong Phu
(74) *Attorney, Agent, or Firm* — Maschoff Brennan

(57) ABSTRACT

The present disclosure provides a method and a device in a User Equipment (UE) and a base station for wireless communication. The UE transmits first information including at least the former two of {K first-type indexes, K1 first-type indexes, K first-type numerical values}. The K1 first-type indexes are a subset of the K first-type indexes. The K first-type indexes are used for determining K antenna port groups. The UE receives simultaneously radio signals from K1 antenna port groups. The K1 first-type indexes are used for determining the K1 antenna port groups. The K first-type numerical values are used for determining K channel qualities. The K1 first-type indexes include at least one given first-type index, and a position of the given first-type index in the K first-type indexes is used for determining whether an antenna port group corresponding to the given first-type index belongs to the K1 antenna port groups.

20 Claims, 15 Drawing Sheets

(56) References Cited

U.S. PATENT DOCUMENTS

2018/0006706 A1* 1/2018 Cheng .................. H04B 7/0695
2018/0212666 A1* 7/2018 Kim ........................ H04B 7/04

* cited by examiner

| First information | K1 first-type indexes | K2 first-type indexes | K1 first-type numerical values | K2 first-type numerical values |

Where "K1 first-type indexes | K2 first-type indexes" is braced as "K first-type indexes" and "K1 first-type numerical values | K2 first-type numerical values" is braced as "K first-type numerical values".

FIG. 7

METHOD AND DEVICE IN UE AND BASE STATION USED FOR WIRELESS COMMUNICATION

CROSS REFERENCE TO RELATED APPLICATION

This application claims the priority benefit of Chinese Patent Application Serial Number 201710798966.8, filed on Sep. 7, 2017, the full disclosure of which is incorporated herein by reference.

BACKGROUND

Technical Field

The present disclosure relates to transmission methods and devices of radio signals in wireless communication systems, and in particular to a transmission method and device for radio signals in a wireless communication system supporting multi-antenna transmission.

Related Art

Massive Multi-Input Multi-Output (MIMO) becomes one research hotspot of next-generation mobile communications. In the massive MIMO, multiple antennas perform beamforming to form a relatively narrow beam which points to a particular direction to improve the quality of communication. Generally, the beam formed by multiple antennas through beamforming is relatively narrow, and a base station needs to acquire a correct beam pointing direction to communicate effectively with a UE. In order to acquire the correct beam pointing direction, the base station needs to transmit reference signals in different beam pointing directions, and the UE determines the correct beam pointing direction by measuring these reference signals and then feeds back the result to the base station. Therefore, how to perform effective feedback using a minimum overhead is a problem to be solved.

SUMMARY

The inventor finds through researches that, in the condition that a UE is configured with multiple antennas, the UE will select multiple beam pointing directions to help a base station realize flexible scheduling, improve the robustness of multi-antenna transmission, or support single-user multi-stream transmission. Depending on the multi-antenna configuration conditions of the UE, radio signals in some beam pointing directions can be received simultaneously by the UE, and radio signals in some beam pointing directions cannot be received simultaneously by the UE. Therefore, it is needed to design an efficient feedback scheme, so that the base station can know which beam pointing directions transmit the radio signals that can be received simultaneously by the UE.

In view of the above problem, the present disclosure provides a solution. The embodiments of the UE of the present disclosure and the characteristics in the embodiments may be applied to the base station, and vice versa, if no conflict is caused. The embodiments of the present disclosure and the characteristics in the embodiments may be arbitrarily and mutually combined if no conflict is caused.

The present disclosure provides a method in a UE for wireless communication. The method includes the following step of:

transmitting first information.

Herein, the first information includes at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group includes a positive integer number of antenna ports; the UE can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

In one embodiment, the above method has the following benefits: positions of corresponding first-type indexes in the K first-type indexes are utilized to indicate implicitly which antenna port groups of the K antenna port groups transmit the radio signals that can be received simultaneously by the UE; and the overhead of feedback is saved.

In one embodiment, the above method has the following benefits: the first information includes antenna port groups that can be received simultaneously by the UE and antenna port groups that cannot be received simultaneously by the UE; the flexibility of feedback is improved, and the delay of feedback is reduced.

In one embodiment, the K first-type indexes are arranged in order.

In one embodiment, positions of the K1 first-type indexes in the K first-type indexes are default (no configuration is required).

In one embodiment, positions of the K1 first-type indexes in the K first-type indexes are configured by a high layer signaling.

In one embodiment, the K1 first-type indexes are K1 first-type indexes in the frontmost of the K first-type indexes.

In one embodiment, the K1 first-type indexes are K1 first-type indexes in the rearmost of the K first-type indexes.

In one embodiment, the K1 first-type indexes are arranged in order.

In one embodiment, if the given first-type index is one of the K1 first-type indexes arranged in the frontmost of the K first-type indexes, an antenna port group corresponding to the given first-type index belongs to the K1 antenna port groups; otherwise, an antenna port group corresponding to the given first-type index does not belong to the K1 antenna port groups.

In one embodiment, if the given first-type index is one of the K1 first-type indexes arranged in the rearmost of the K first-type indexes, an antenna port group corresponding to the given first-type index belongs to the K1 antenna port groups; otherwise, an antenna port group corresponding to the given first-type index does not belong to the K1 antenna port groups.

In one embodiment, the first information is used for determining the K1.

In one embodiment, any one first-type index of the K first-type indexes is a Channel-state information reference signals Resource Indicator (CRI).

In one embodiment, the K first-type numerical values are arranged in order.

In one embodiment, one antenna port is formed by superposition of multiple antennas through antenna virtualization, and the mapping coefficients from the multiple antennas to the antenna port constitute a beamforming vector corresponding to the antenna port.

In one embodiment, any one channel quality of the K channel qualities is a Reference Signal Received Power (RSRP).

In one embodiment, any one channel quality of the K channel qualities is a Reference Signal Received Quality (RSRQ).

In one embodiment, any one channel quality of the K channel qualities is a Channel Quality Indicator (CQI).

In one embodiment, the first information is Uplink Control Information (UCI).

In one embodiment, the first information includes one or more of {Channel State Information (CSI), CRI, RSRP, RSRQ, CQI, Precoder Matrix Indicator (PMI)}.

In one embodiment, the K1 is less than the K.

In one embodiment, the K1 is equal to the K.

In one embodiment, the UE can receive simultaneously radio signals coming from the K1 antenna port groups, using a same receiving beamforming vector.

In one embodiment, the UE can receive simultaneously radio signals coming from the K1 antenna port groups, using different receiving beamforming vectors.

In one subembodiment, the different receiving beamforming vectors are applied to different antenna groups; one antenna group includes a positive integer number of antennas; and the different antenna groups correspond to different Radio Frequency (RF) chains.

In one embodiment, a target receiver of the first information cannot assume that the UE can receive simultaneously radio signals coming from any two antenna port groups in the K antenna port groups that do not belong to the K1 antenna port groups.

In one embodiment, a target receiver of the first information cannot assume that the UE can receive simultaneously radio signals coming from a first antenna port group and a second antenna port group, wherein the first antenna port group is any one antenna port group of the K1 antenna port groups, and the second antenna port group is any one antenna port group in the K antenna port groups that does not belong to the K1 antenna port groups.

In one embodiment, the first information is carried by a physical layer signaling.

In one embodiment, the first information is transmitted on an uplink physical layer control channel (that is, an uplink channel capable of carrying a physical layer signaling only).

In one embodiment, the first information is transmitted on an uplink physical layer data channel (that is, an uplink channel capable of carrying physical layer data).

According to one aspect of the present disclosure, the method includes the following step of:

receiving M reference signals.

Herein, the M reference signals are transmitted by M antenna port groups respectively, the K antenna port groups are a subset of the M antenna port groups, and the M is a positive integer not less than the K.

In one embodiment, the K first-type indexes indicate indexes of the K antenna port groups in the M antenna port groups respectively.

In one embodiment, measurements of K reference signals are used for determining the K first-type numerical values, the K reference signals are a subset of the M reference signals, and the K reference signals are transmitted by the K antenna port groups respectively.

In one embodiment, measurements of the M reference signals are used for determining the K antenna port groups.

In one embodiment, measurements of the M reference signals are used for determining M reference channel qualities respectively, K reference channel qualities are a subset of the M reference channel qualities, measurements of K reference signals are used for determining the K reference channel qualities respectively, the K reference signals are a subset of the M reference signals, and the K reference signals are transmitted by the K antenna port groups respectively.

In one subembodiment, any one reference channel quality of the K reference channel qualities is greater than any one reference channel quality in the M reference channel qualities that does not belong to the K reference channel qualities.

In one subembodiment, any one reference channel quality of the K reference channel qualities is greater than a first threshold, and the first threshold is a positive real number.

In one subembodiment, the K reference channel qualities are used for determining the K first-type numerical values.

In one subembodiment, the K channel qualities are quantized values of the K reference channel qualities respectively.

In one subembodiment, any one reference channel quality of the M reference channel qualities is an RSRP.

In one subembodiment, any one reference channel quality of the M reference channel qualities is an RSRQ.

In one subembodiment, any one reference channel quality of the M reference channel qualities is a CQI.

In one embodiment, time domain resources occupied by any two of the M reference signals are mutually orthogonal (non-overlapping).

In one embodiment, time domain resources occupied by at least two of the M reference signals are mutually orthogonal (non-overlapping).

In one embodiment, time domain resources occupied by at least two of the M reference signals are the same.

In one embodiment, the M reference signals include one or more of {Synchronization Signals (SS), Master Information Block (MIB)/System Information Block (SIB), Channel State Information Reference Signals (CSI-RS)}.

In one embodiment, the K is less than the M.

In one embodiment, the M reference signals appear multiple times in time domain.

In one subembodiment, time interval between any two adjacent appearances of the M reference signals in time domain is the same.

In one embodiment, the M reference signals appear one time only in time domain.

In one embodiment, the M reference signals are aperiodic.

In one embodiment, the M reference signals are periodic.

In one embodiment, the M reference signals are semi-persistent.

In one embodiment, the M reference signals are wideband.

In one embodiment, a system bandwidth is divided into a positive integer number of frequency-domain areas, any one of the M reference signals appears on all of the positive integer number of frequency-domain areas, and any one of the positive integer number of frequency-domain areas includes a positive integer number of continuous subcarriers.

In one subembodiment, any two of the positive integer number of frequency-domain areas include a same number of subcarriers.

In one embodiment, the M reference signals are narrowband.

In one embodiment, a system bandwidth is divided into a positive integer number of frequency-domain areas, any one of the M reference signals appears on part of the positive integer number of frequency-domain areas only, and any one of the positive integer number of frequency-domain areas includes a positive integer number of continuous subcarriers.

In one subembodiment, any two of the positive integer number of frequency-domain areas include a same number of subcarriers.

In one embodiment, any two of the M antenna port groups include a same number of antenna ports.

In one embodiment, the M antenna port groups include at least two antenna port groups that have different numbers of antenna ports.

In one embodiment, the M antenna port groups include at least one antenna port group that has one antenna port.

In one embodiment, the M antenna port groups include at least one antenna port group that has more than one antenna port.

According to one aspect of the present disclosure, the method is characterized in that: the K channel qualities include at least one first given channel quality, a difference between the first given channel quality and a first channel quality is related to a first-type numerical value corresponding to the first given channel quality, and the first channel quality is a channel quality in the K channel qualities that is not equal to the first given channel quality.

In one embodiment, the above method has the following benefits: part channel qualities of the K channel qualities are fed back by a differential method, and the overhead of feedback is reduced.

In one embodiment, a position of a first-type numerical value corresponding to the first channel quality in the K first-type numerical values is default (no configuration is required).

In one embodiment, a first-type numerical value corresponding to the first channel quality is a first first-type numerical value in the K first-type numerical values.

In one embodiment, an index of a first-type numerical value corresponding to the first channel quality in the K first-type numerical values is equal to 0.

In one embodiment, a position of a first-type index corresponding to the first channel quality in the K first-type indexes is default (no configuration is required).

In one embodiment, a first-type index corresponding to the first channel quality is the first first-type index in the K first-type indexes.

In one embodiment, an index of a first-type index corresponding to the first channel quality in the K first-type indexes is equal to 0.

In one embodiment, the first information indicates a position of a first-type numerical value corresponding to the first channel quality in the K first-type numerical values.

In one embodiment, the first information indicates a position of a first-type index corresponding to the first channel quality in the K first-type indexes.

In one embodiment, an antenna port group corresponding to the first channel quality is one antenna port group of the K1 antenna port groups.

In one embodiment, a first-type index corresponding to the first channel quality is one first-type index of the K1 first-type indexes.

In one subembodiment, a position of a first-type index corresponding to the first channel quality in the K1 first-type indexes is default (no configuration is required).

In one subembodiment, a first-type index corresponding to the first channel quality is a first first-type index in the K1 first-type indexes.

In one subembodiment, an index of a first-type index corresponding to the first channel quality in the K1 first-type indexes is equal to 0.

In one embodiment, K1 first-type numerical values are arranged in order, the K1 first-type numerical values are a subset of the K first-type numerical values, and the K1 first-type numerical values are one-to-one corresponding to the K1 antenna port groups.

In one embodiment, a first-type numerical value corresponding to the first channel quality is a first first-type numerical value in K1 first-type numerical values, the K1 first-type numerical values are a subset of the K first-type numerical values, and the K1 first-type numerical values are one-to-one corresponding to the K1 antenna port groups.

In one subembodiment, a first-type numerical value corresponding to the first channel quality is a first first-type numerical value in the K1 first-type numerical values.

In one subembodiment, a position of a first-type numerical value corresponding to the first channel quality in the K1 first-type numerical values is default (no configuration is required).

In one subembodiment, an index of a first-type numerical value corresponding to the first channel quality in the K1 first-type numerical values is equal to 0.

In one embodiment, the difference between the first given channel quality and the first channel quality being related to the first-type numerical value corresponding to the first given channel quality refers that: the first-type numerical value corresponding to the first given channel quality is used for determining the difference between the first given channel quality and the first channel quality.

In one embodiment, the difference between the first given channel quality and the first channel quality being related to the first-type numerical value corresponding to the first given channel quality refers that: the difference between the first given channel quality and the first channel quality belongs to Q1 candidate differences, and the first-type numerical value corresponding to the first given channel quality indicates an index of the difference between the first given channel quality and the first channel quality in the Q1 candidate differences, wherein the Q1 is a positive integer greater than 1.

In one embodiment, the difference between the first given channel quality and the first channel quality being related to the first-type numerical value corresponding to the first given channel quality refers that: the first-type numerical value corresponding to the first given channel quality is used for determining a ratio of the difference between the first given channel quality and the first channel quality to a first quantization step, wherein the first quantization step is a positive real number.

In one subembodiment, the first quantization step is configured by a high layer signaling.

In one subembodiment, the first information is used for determining the first quantization step.

In one subembodiment, the ratio of the difference between the first given channel quality and the first channel quality to the first quantization step is an integer.

In one subembodiment, the first-type numerical value corresponding to the first given channel quality is used for determining a first coefficient, and the first given channel quality is equal to the first channel quality minus a product of the first coefficient and the first quantization step, wherein the first coefficient is a non-negative integer.

In one embodiment, the first channel quality is unrelated to a first-type numerical values in the K first-type numerical values other than a first-type numerical value corresponding to the first channel quality.

In one embodiment, the first channel quality belongs to Q candidate channel qualities, a first-type numerical value corresponding to the first channel quality indicates an index of the first channel quality in the Q candidate channel qualities, wherein Q is a positive integer greater than 1.

In one embodiment, the K channel qualities include at least one channel quality that has a difference to the first given channel quality being related to a corresponding first-type numerical value.

According to one aspect of the present disclosure, the method is characterized in that: the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to a first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

In one embodiment, the intersection of the K1 channel qualities and the K2 channel qualities is a null set, that is to say, there is no channel quality that belongs to both the K1 channel qualities and the K2 channel qualities.

In one embodiment, a position of a first-type numerical value corresponding to the second channel quality in the K first-type numerical values is default (no configuration is required).

In one embodiment, a first-type numerical value corresponding to the second channel quality is the (K1+1)th first-type numerical value in the K first-type numerical values.

In one embodiment, an index of a first-type numerical value corresponding to the second channel quality in the K first-type numerical values is equal to the K1.

In one embodiment, a position of a first-type index corresponding to the second channel quality in the K first-type indexes is default (no configuration is required).

In one embodiment, a first-type index corresponding to the second channel quality is the (K1+1)th first-type index in the K first-type indexes.

In one embodiment, an index of a first-type index corresponding to the second channel quality in the K first-type indexes is equal to the K1.

In one embodiment, the first information indicates a position of a first-type numerical value corresponding to the second channel quality in the K first-type numerical values.

In one embodiment, the first information indicates a position of a first-type index corresponding to the second channel quality in the K first-type indexes.

In one embodiment, K2 first-type numerical values are arranged in order, and the K2 first-type numerical values are first-type numerical values in the K first-type numerical values that are corresponding to the K2 channel qualities respectively.

In one embodiment, a position of a first-type numerical value corresponding to the second channel quality in K2 first-type numerical values is default (no configuration is required), and the K2 first-type numerical values are first-type numerical values in the K first-type numerical values that are corresponding to the K2 channel qualities respectively.

In one embodiment, a first-type numerical value corresponding to the second channel quality is a first first-type numerical value in K2 first-type numerical values, and the K2 first-type numerical values are first-type numerical values in the K first-type numerical values that are corresponding to the K2 channel qualities respectively.

In one embodiment, an index of a first-type numerical value corresponding to the second channel quality in K2 first-type numerical values is equal to 0, and the K2 first-type numerical values are first-type numerical values in the K first-type numerical values that are corresponding to the K2 channel qualities respectively.

In one embodiment, K2 first-type indexes are arranged in order, and the K2 first-type indexes are first-type indexes in the K first-type indexes that are corresponding to the K2 channel qualities respectively.

In one embodiment, a position of a first-type index corresponding to the second channel quality in K2 first-type indexes is default (no configuration is required), and the K2 first-type indexes are first-type indexes in the K first-type indexes that are corresponding to the K2 channel qualities respectively.

In one embodiment, a first-type index corresponding to the second channel quality is a first first-type index in K2 first-type indexes, and the K2 first-type indexes are first-type indexes in the K first-type indexes that are corresponding to the K2 channel qualities respectively.

In one embodiment, an index of a first-type index corresponding to the second channel quality in K2 first-type indexes is equal to 0, and the K2 first-type indexes are first-type indexes in the K first-type indexes that are corresponding to the K2 channel qualities respectively.

In one embodiment, the K2 channel qualities include at least one channel quality that is unrelated to any one of K1 first-type numerical values, and the K1 first-type numerical values are first-type numerical values in the K first-type numerical values that are corresponding to the K1 channel qualities.

In one embodiment, any one of the K2 channel qualities is unrelated to any one of K1 first-type numerical values, and the K1 first-type numerical values are first-type numerical values in the K first-type numerical values that are corresponding to the K1 channel qualities.

In one embodiment, the K1 channel qualities include at least one channel quality that is unrelated to any one of K2 first-type numerical values, and the K2 first-type numerical values are first-type numerical values in the K first-type numerical values that are corresponding to the K2 channel qualities respectively.

In one embodiment, any one of the K1 channel qualities is unrelated to any one of K2 first-type numerical values, and the K2 first-type numerical values are first-type numerical values in the K first-type numerical values that are corresponding to the K2 channel qualities respectively.

In one embodiment, the difference between the second given channel quality and the second channel quality being related to the first-type numerical value corresponding to the second given channel quality refers that: the first-type numerical value corresponding to the second given channel quality is used for determining the difference between the second given channel quality and the second channel quality.

In one embodiment, the difference between the second given channel quality and the second channel quality being related to the first-type numerical value corresponding to the second given channel quality refers that: the difference between the second given channel quality and the second channel quality belongs to Q2 candidate differences, and the first-type numerical value corresponding to the second given channel quality indicates an index of the difference between the second given channel quality and the second channel quality in the Q2 candidate differences, wherein Q2 is a positive integer greater than 1.

In one embodiment, the difference between the second given channel quality and the second channel quality being related to the first-type numerical value corresponding to the second given channel quality refers that: the first-type numerical value corresponding to the second given channel quality is used for determining a ratio of the difference between the second given channel quality and the second channel quality to a second quantization step, wherein the second quantization step is a positive real number.

In one subembodiment, the second quantization step is configured by a high layer signaling.

In one subembodiment, the first information is used for determining the second quantization step.

In one subembodiment, the ratio of the difference between the second given channel quality and the second channel quality to the second quantization step is an integer.

In one subembodiment, the first-type numerical value corresponding to the second given channel quality is used for determining a second coefficient, and the second given channel quality is equal to the second channel quality minus a product of the second coefficient and the second quantization step, wherein the second coefficient is a non-negative integer.

In one embodiment, the second channel quality is unrelated to a first-type numerical values in the K first-type numerical values other than a first-type numerical value corresponding to the second channel quality.

In one embodiment, the second channel quality belongs to Q candidate channel qualities, a first-type numerical value corresponding to the second channel quality indicates an index of the second channel quality in the Q candidate channel qualities, wherein Q is a positive integer greater than 1.

In one embodiment, the K1 channel qualities include at least one channel quality that has a difference to the first given channel quality being related to a corresponding first-type numerical value.

In one embodiment, the K2 channel qualities include at least one channel quality that has a difference to the second given channel quality being related to a corresponding first-type numerical value.

According to one aspect of the present disclosure, the method is characterized in that: the K first-type numerical values are arranged in order.

In one embodiment, values of channel qualities corresponding to the K first-type numerical value decrease successively.

In one embodiment, the first channel quality is a largest channel quality in the K channel qualities.

According to one aspect of the present disclosure, the method is characterized in that: K1 first-type numerical values and K2 first-type numerical values are arranged in order respectively; the K1 first-type numerical values and the K2 first-type numerical values are subsets of the K first-type numerical values respectively; the K1 first-type numerical values are one-to-one corresponding to the K1 channel qualities, and the K2 first-type numerical values are one-to-one corresponding to the K2 channel qualities.

In one embodiment, values of channel qualities corresponding to the K1 first-type numerical values decrease successively.

In one embodiment, values of channel qualities corresponding to the K2 first-type numerical values decrease successively.

In one embodiment, the first channel quality is a largest channel quality in the K1 channel qualities.

In one embodiment, the second channel quality is a largest channel quality in the K2 channel qualities.

In one embodiment, the K1 first-type indexes are arranged in order.

In one embodiment, K2 first-type indexes are arranged in order, and the K2 first-type indexes consists of the first-type indexes in the K first-type indexes that do not belong to the K1 first-type indexes.

According to one aspect of the present disclosure, the method includes the following step of:

receiving downlink information.

Herein, the downlink information is used for determining at least one of {the K, the K1}.

In one embodiment, the downlink information indicates at least one of {the K, the K1}.

In one embodiment, the downlink information is carried by a high layer signaling.

In one embodiment, the downlink information is carried by a Radio Resource Control (RRC) signaling.

In one embodiment, the downlink information is carried by a Medium Access Control Layer Control Element (MAC CE) signaling.

In one embodiment, the downlink information is carried by a physical layer signaling.

In one embodiment, the downlink information triggers the transmission of the first information.

In one embodiment, the downlink information is used for determining configuration information for the first information.

In one subembodiment, the configuration information for the first information includes one or more of {content of the first information, time domain resource occupied by a signaling carrying the first information, frequency domain resource occupied by a signaling carrying the first information, code domain resource occupied by a signaling carrying the first information, cyclic shift corresponding to a signaling carrying the first information, Orthogonal Cover Code (OCC) corresponding to a signaling carrying the first information, PUCCH format}.

In one embodiment, the downlink information is used for determining positions of the K1 first-type indexes in the K first-type indexes.

In one embodiment, the downlink information is used for determining a position of a first-type numerical value corresponding to the first channel quality in the K first-type numerical values.

In one embodiment, the downlink information is used for determining a position of a first-type numerical value corresponding to the second channel quality in the K first-type numerical values.

In one embodiment, the downlink information is transmitted on a downlink physical layer data channel (that is, a downlink channel capable of carrying physical layer data).

In one subembodiment, the downlink physical layer data channel is a Physical Downlink Shared Channel (PDSCH).

In one subembodiment, the downlink physical layer data channel is a short PDSCH (sPDSCH).

In one subembodiment, the downlink physical layer data channel is a New Radio PDSCH (NR-PDSCH).

In one subembodiment, the downlink physical layer data channel is a Narrow Band PDSCH (NB-PDSCH).

In one embodiment, the downlink information is transmitted on a downlink physical layer control channel (that is, a downlink channel capable of carrying a physical layer signaling only).

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one subembodiment, the downlink physical layer control channel is a Narrow Band PDCCH (NB-PDCCH).

The present disclosure provides a method in a base station for wireless communication. The method includes the following step of:

receiving first information.

Herein, the first information includes at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group includes a positive integer number of antenna ports; the transmitter of the first information can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

In one embodiment, the K first-type indexes are arranged in order.

In one embodiment, positions of the K1 first-type indexes in the K first-type indexes are default (no configuration is required).

In one embodiment, the K1 first-type indexes are arranged in order.

In one embodiment, the K first-type numerical values are arranged in order.

In one embodiment, the base station cannot assume that the transmitter of the first information can receive simultaneously radio signals coming from any two antenna port groups in the K antenna port groups that do not belong to the K1 antenna port groups.

In one embodiment, the base station cannot assume that the transmitter of the first information can receive simultaneously radio signals coming from a first antenna port group and a second antenna port group, wherein the first antenna port group is any one antenna port group of the K1 antenna port groups, and the second antenna port group is any one antenna port group in the K antenna port groups that does not belong to the K1 antenna port groups.

According to one aspect of the present disclosure, the method includes the following step of:

transmitting M reference signals.

Herein, the M reference signals are transmitted by M antenna port groups respectively, the K antenna port groups are a subset of the M antenna port groups, and the M is a positive integer not less than the K.

In one embodiment, measurements for K reference signals are used for determining the K first-type numerical values, the K reference signals are a subset of the M reference signals, and the K reference signals are transmitted by the K antenna port groups respectively.

According to one aspect of the present disclosure, the method is characterized in that: the K channel qualities include at least one first given channel quality, a difference between the first given channel quality and a first channel quality is related to a first-type numerical value corresponding to the first given channel quality, and the first channel quality is a channel quality in the K channel qualities that is not equal to the first given channel quality.

In one embodiment, an antenna port group corresponding to the first channel quality is one antenna port group of the K1 antenna port groups.

According to one aspect of the present disclosure, the method is characterized in that: the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to a first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

According to one aspect of the present disclosure, the method is characterized in that: the K first-type numerical values are arranged in order.

According to one aspect of the present disclosure, the method is characterized in that: K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

According to one aspect of the present disclosure, the method includes the following step of:

transmitting downlink information.

Herein, the downlink information is used for determining at least one of {the K, the K1}.

The present disclosure provides a UE device for wireless communication. The UE device includes:

a first transmitter module, to transmit first information.

Herein, the first information includes at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group includes a positive integer number of antenna ports; the UE can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

In one embodiment, the above UE device for wireless communication is characterized in that: the K channel qualities include at least one first given channel quality, a difference between the first given channel quality and a first channel quality is related to a first-type numerical value corresponding to the first given channel quality, and the first channel quality is a channel quality in the K channel qualities that is not equal to the first given channel quality.

In one embodiment, the above UE device for wireless communication is characterized in that: the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to a first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

In one reference embodiment of the above embodiment, the above UE device for wireless communication is characterized in that: K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

In one embodiment, the above UE device for wireless communication is characterized in that: the K first-type numerical values are arranged in order.

In one embodiment, the above UE device for wireless communication includes:

a first receiver module, to receive M reference signals.

Herein, the M reference signals are transmitted by M antenna port groups respectively, the K antenna port groups are a subset of the M antenna port groups, and the M is a positive integer not less than the K.

In one embodiment, the above UE device for wireless communication is characterized in that: the first receiver module further receives downlink information, wherein the downlink information is used for determining at least one of {the K, the K1}.

The present disclosure provides a base station device for wireless communication. The base station includes:

a second receiver module, to receive first information.

Herein, the first information includes at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group includes a positive integer number of antenna ports; the transmitter of the first information can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

In one embodiment, the above base station device for wireless communication is characterized in that: the K channel qualities include at least one first given channel quality, a difference between the first given channel quality and a first channel quality is related to a first-type numerical value corresponding to the first given channel quality, and the first channel quality is a channel quality in the K channel qualities that is not equal to the first given channel quality.

In one subembodiment, the above base station device for wireless communication is characterized in that: the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to a first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

In one reference embodiment of the above subembodiment, the above base station device for wireless communication is characterized in that: K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

In one embodiment, the above base station device for wireless communication is characterized in that: the K first-type numerical values are arranged in order.

In one embodiment, the base station device for wireless communication further includes:

a second transmitter module, to transmit M reference signals.

Herein, the M reference signals are transmitted by M antenna port groups respectively, the K antenna port groups are a subset of the M antenna port groups, and the M is a positive integer not less than the K.

In one subembodiment, the above base station device for wireless communication is characterized in that: the second transmitter module further transmits downlink information, wherein the downlink information is used for determining at least one of {the K, the K1}.

In one embodiment, compared with traditional schemes: the present disclosure has the following benefits.

Indexes of multiple antenna port groups are fed back simultaneously in one feedback. Radio signals transmitted by part of the multiple antenna port groups can be received simultaneously by a UE, and radio signals transmitted by the other part of the multiple antenna port groups can or cannot be received simultaneously by the UE. The above method improves the flexibility of feedback and reduces the delay of feedback.

The position of the index corresponding to each antenna port group in the indexes of multiple antenna port groups that are fed back simultaneously is utilized to indicate implicitly which antenna port groups transmit radio signals that can be received simultaneously by the UE. The overhead of feedback is saved.

Differential feedback is supported for the channel qualities corresponding to part of the multiple antenna port groups. The overhead of feedback is further reduced.

BRIEF DESCRIPTION OF THE DRAWINGS

Other features, purposes and advantages of the present disclosure will become more apparent from the detailed description of non-restrictive embodiments taken in conjunction with the following drawings.

FIG. 7 is a diagram illustrating the content of first information according to one embodiment of the present disclosure.

DESCRIPTION OF THE EMBODIMENTS

Embodiment 1

Figure 1:
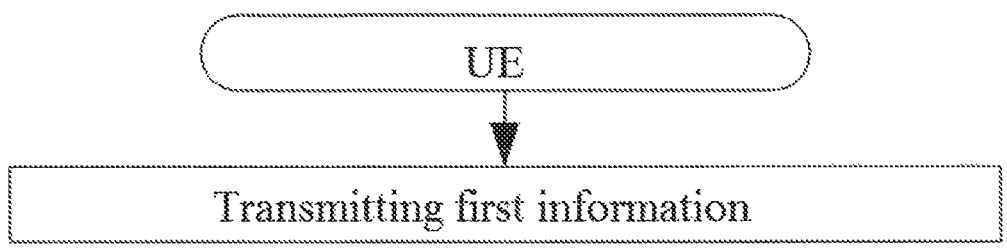
FIG. 1 is a flowchart of first information according to one embodiment of the present disclosure.

Embodiment 1 illustrates an example of a flowchart of first information, as shown in FIG. 1.

In Embodiment 1, the UE in the present disclosure transmits first information. The first information includes at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group includes a positive integer number of antenna ports; the UE can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

In one embodiment, the K first-type indexes are arranged in order.

In one embodiment, positions of the K1 first-type indexes in the K first-type indexes are default (no configuration is required).

In one embodiment, positions of the K1 first-type indexes in the K first-type indexes are configured by a high layer signaling.

In one embodiment, the K1 first-type indexes are K1 first-type indexes in the frontmost of the K first-type indexes.

In one embodiment, indexes of the K1 first-type indexes in the K first-type indexes are 0 to (K1−1) respectively.

In one embodiment, the K1 first-type indexes are K1 first-type indexes in the rearmost of the K first-type indexes.

In one embodiment, indexes of the K1 first-type indexes in the K first-type indexes are (K−K1) to (K−1) respectively.

In one embodiment, the K1 first-type indexes are arranged in order.

In one embodiment, the first-type indexes in the K first-type indexes that do not belong to the K1 first-type indexes are arranged in order.

In one embodiment, if the given first-type index is one of the K1 first-type indexes arranged in the frontmost of the K first-type indexes, an antenna port group corresponding to the given first-type index belongs to the K1 antenna port groups; otherwise, an antenna port group corresponding to the given first-type index does not belong to the K1 antenna port groups.

In one embodiment, if the given first-type index is one of the K1 first-type indexes arranged in the rearmost of the K first-type indexes, an antenna port group corresponding to the given first-type index belongs to the K1 antenna port groups; otherwise, an antenna port group corresponding to the given first-type index does not belong to the K1 antenna port groups.

In one embodiment, the first information is used for determining the K1.

In one embodiment, the first information indicates the K1.

In one embodiment, the first information indicates the K1 explicitly.

In one embodiment, any one first-type index of the K first-type indexes is a CRI.

In one embodiment, any one first-type index of the K first-type indexes includes a positive integer number of bits.

In one subembodiment, any two first-type indexes of the K first-type indexes include a same number of bits.

In one subembodiment, the K first-type indexes include at least two first-type indexes that have different numbers of bits.

In one embodiment, the K first-type numerical values are arranged in order.

In one embodiment, for any one given first-type numerical value of the K first-type numerical values, an index of a first-type index corresponding to the given first-type numerical value in the K first-type indexes is equal to an index of the given first-type numerical value in the K first-type numerical values.

In one embodiment, one antenna port is formed by superposition of multiple antennas through antenna virtualization, and the mapping coefficients from the multiple antennas to the antenna port constitute a beamforming vector corresponding to the antenna port.

In one embodiment, any two antenna port groups of the K antenna port groups include a same number of antenna ports.

In one embodiment, the K antenna port groups include at least two antenna port groups that have different numbers of antenna ports.

In one embodiment, the K antenna port groups include at least one antenna port group that has one antenna port.

In one embodiment, the K antenna port groups include at least one antenna port group that has more than one antenna port.

In one embodiment, any one channel quality of the K channel qualities is an RSRP.

In one embodiment, any one channel quality of the K channel qualities is an RSRQ.

In one embodiment, any one channel quality of the K channel qualities is a CQI.

In one embodiment, the first information is a UCI.

In one embodiment, the first information includes one or more of {CSI, CRI, RSRP, RSRQ, CQI, PMI}.

In one embodiment, the K1 is less than the K.

In one embodiment, the K1 is equal to the K.

In one embodiment, the first information includes {the K first-type indexes, the K1 first-type indexes, the K first-type numerical values}.

In one embodiment, the first information includes {the K first-type indexes, the K1 first-type indexes}.

In one embodiment, the act that the UE can receive simultaneously radio signals coming from multiple antenna port groups refers that: the UE can receive, on one same multi-carrier symbol, the radio signals coming from multiple antenna port groups.

In one subembodiment, the multi-carrier symbol is an Orthogonal Frequency Division Multiplexing (OFDM) symbol.

In one subembodiment, the multi-carrier symbol is a Discrete Fourier Transform Spread OFDM (DFT-S-OFDM) symbol.

In one subembodiment, the multi-carrier symbol is a Filter Bank Multi Carrier (FBMC) symbol.

In one embodiment, the act that the UE can receive simultaneously radio signals coming from multiple antenna port groups refers that: the UE can receive multiple radio signals on one same multi-carrier symbol, wherein the multiple radio signals are transmitted by the multiple antenna port groups respectively.

In one embodiment, the act that the UE can receive simultaneously radio signals coming from the K1 antenna port groups refers that: the UE can receive K1 radio signals on one same multi-carrier symbol, wherein the K1 radio signals are transmitted by the K1 antenna port group respectively.

In one embodiment, the UE can receive simultaneously radio signals coming from the K1 antenna port groups, using a same receiving beamforming vector.

In one embodiment, the UE can receive K1 radio signals simultaneously using a same receiving beamforming vector, wherein the K1 radio signals are transmitted by the K1 antenna port groups respectively.

In one embodiment, the UE can receive simultaneously radio signals coming from the K1 antenna port groups, using different receiving beamforming vectors.

In one subembodiment, the different receiving beamforming vectors are applied to different antenna groups, one antenna group includes a positive integer number of antennas, and the different antenna groups correspond to different RF chains.

In one embodiment, the UE can receive K1 radio signals using K1 receiving beamforming vectors respectively on one same multi-carrier symbol, and the K1 radio signals are transmitted by the K1 antenna port groups respectively.

In one subembodiment, any two receiving beamforming vectors of the K1 receiving beamforming vectors are the same.

In one subembodiment, the K1 receiving beamforming vectors include at least two receiving beamforming vectors that are different, any two different receiving beamforming vectors in the K1 receiving beamforming vectors are applied to different antenna groups respectively, one antenna group includes a positive integer number of antennas, and the different antenna groups correspond to different RF chains.

In one embodiment, a target receiver of the first information cannot assume that the UE can receive simultaneously radio signals coming from any two antenna port groups in the K antenna port groups that do not belong to the K1 antenna port groups.

In one embodiment, a target receiver of the first information cannot assume that the UE can receive simultaneously radio signals coming from a first antenna port group and a second antenna port group, wherein the first antenna port group is any one antenna port group of the K1 antenna port groups, and the second antenna port group is any one antenna port group in the K antenna port groups that does not belong to the K1 antenna port groups.

In one embodiment, the K antenna port groups include at least two antenna port groups that do not belong to the K1 antenna port groups, and the UE can receive simultaneously radio signaling coming from the two antenna port groups that do not belong to the K1 antenna port groups.

In one embodiment, the UE cannot receive simultaneously radio signals coming from any two antenna port groups in the K antenna port groups that do not belong to the K1 antenna port groups.

In one embodiment, the first information is carried by a physical layer signaling.

In one embodiment, the first information is transmitted on an uplink physical layer control channel (that is, an uplink channel capable of carrying a physical layer signaling only).

In one subembodiment, the uplink physical layer control channel is a Physical Uplink Control Channel (PUCCH).

In one subembodiment, the uplink physical layer control channel is a short PUCCH (sPUCCH).

In one subembodiment, the uplink physical layer control channel is a New Radio PUCCH (NR-PUCCH)

In one subembodiment, the uplink physical layer control channel is a Narrow Band PUCCH (NB-PUCCH).

In one embodiment, the first information is transmitted on an uplink physical layer data channel (that is, an uplink channel capable of carrying physical layer data).

In one subembodiment, the uplink physical layer data channel is a Physical Uplink Shared Channel (PUSCH).

In one subembodiment, the uplink physical layer data channel is a short PUSCH (sPUSCH).

In one subembodiment, the uplink physical layer data channel is a New Radio PUSCH (NR-PUSCH).

In one subembodiment, the uplink physical layer data channel is a Narrow Band PUSCH (NB-PUSCH).

Embodiment 2

Figure 2:
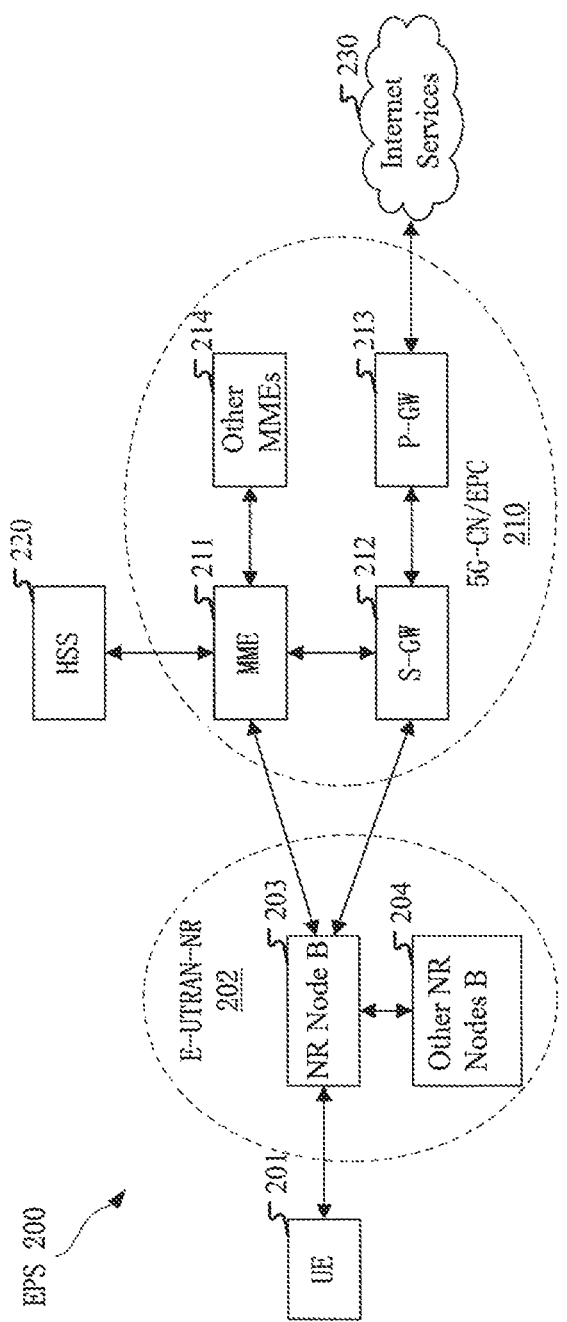
FIG. 2 is a diagram illustrating a network architecture according to one embodiment of the present disclosure.

Embodiment 2 illustrates an example of a diagram of a network architecture, as shown in FIG. 2.

FIG. 2 illustrates a network architecture 200 of Long-Term Evolution (LTE), Long-Term Evolution Advanced (LTE-A) and future 5G systems. The LTE network architecture 200 may be called an Evolved Packet System (EPS) 200. The EPS 200 may include one or more UEs 201, an Evolved UMTS Terrestrial Radio Access Network-New Radio (E-UTRAN-NR) 202, a 5G-Core Network/Evolved Packet Core (5G-CN/EPC) 210, a Home Subscriber Server (HSS) 220 and an Internet Service 230. Herein, the UMTS represents Universal Mobile Telecommunication System. The EPS may be interconnected with other access networks. For simple description, the entities/interfaces are not shown. As shown in FIG. 2, the EPS provides packet switching services. Those skilled in the art are easy to understand that various concepts presented throughout the present disclosure can be extended to networks providing circuit switching services. The E-UTRAN-NR includes an NR node B (gNB) 203 and other gNBs 204. The gNB 203 provides UE 201 oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 203 provides an access point to the 5G-CN/EPC 210 for the UE 201. Examples of UE 201 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or other appropriate terms. The gNB 203 is connected to the 5G-CN/EPC 210 via an S1 interface. The 5G-CN/EPC 210 includes an MME 211, other MMEs 214, a Service Gateway (S-GW) 212 and a Packet Data Network Gateway (P-GW) 213. The MME 211 is a control node for processing a signaling between the UE 201 and the 5G-CN/EPC 210. Generally, the MME 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet service 230. The Internet service 230 includes IP services corresponding to operators, specifically including Internet, Intranet, IP Multimedia Subsystems (IP IMSs) and Packet Switching Streaming Services (PSSs).

In one subembodiment, the UE 201 corresponds to the UE in the present disclosure.

In one subembodiment, the gNB 203 corresponds to the base station in the present disclosure.

Embodiment 3

Figure 3:
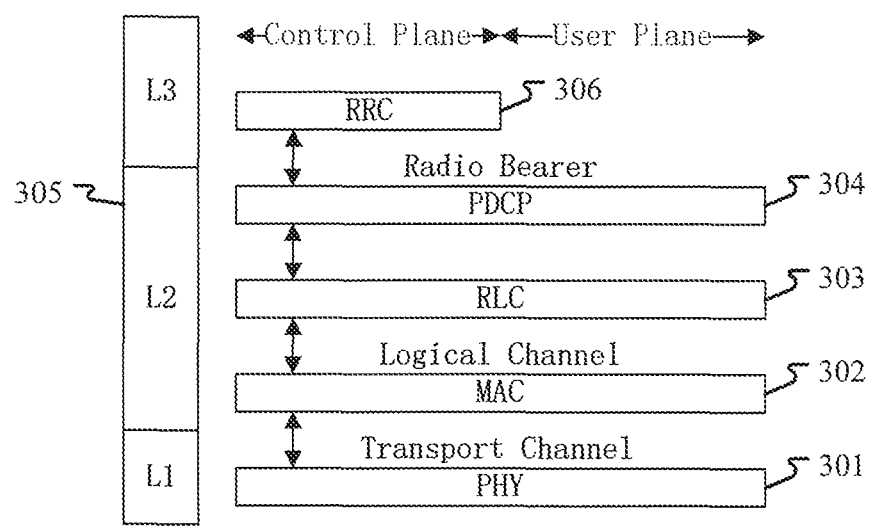
FIG. 3 is a diagram illustrating an embodiment of a radio protocol architecture of a user plane and a control plane according to one embodiment of the present disclosure.

Embodiment 3 illustrates an example of a diagram of an embodiment of a radio protocol architecture of a user plane and a control plane, as shown in FIG. 3.

FIG. 3 is a diagram illustrating an embodiment of a radio protocol architecture of a user plane and a control plane. In FIG. 3, the radio protocol architecture of a UE and a gNB is represented by three layers, which are a layer 1, a layer 2 and a layer 3 respectively. The layer 1 (L1) 301 is the lowest layer and performs signal processing functions of each PHY layer. The layer 1 is called PHY 301 in this paper. The layer 2 (L2) 305 is above the PHY 301, and is in charge of the link between the UE and the gNB via the PHY 301. In the user plane, the L2 305 includes a Medium Access Control (MAC) sublayer 302, a Radio Link Control (RLC) sublayer 303, and a Packet Data Convergence Protocol (PDCP) sublayer 304. All the three sublayers terminate at the gNB of the network side. Although not described in FIG. 3, the UE may include several higher layers above the L2 305, such as a network layer (i.e. IP layer) terminated at a P-GW of the network side and an application layer terminated at the other side of the connection (i.e. a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a lost packet to as to compensate the disordered receiving caused by Hybrid Automatic Repeat Request (HARQ). The MAC sublayer 302 provides multiplexing between logical channels and transport channels. The MAC sublayer 302 is also responsible for allocating between UEs various radio resources (i.e., resource block) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression function for the control plane. The control plane also includes a Radio Resource Control (RRC) sublayer 306 in the layer 3 (L3). The RRC sublayer 306 is responsible for acquiring radio resources (i.e. radio bearer) and configuring the lower layers using an RRC signaling between the gNB and the UE.

In one subembodiment, the radio protocol architecture in FIG. 3 is applicable to the UE in the present disclosure.

In one subembodiment, the radio protocol architecture in FIG. 3 is applicable to the base station in the present disclosure.

In one subembodiment, the first information in the present disclosure is generated by the PHY 301.

In one subembodiment, the M reference signals in the present disclosure are generated by the PHY 301.

In one subembodiment, the downlink information in the present disclosure is generated by the PHY 301.

In one subembodiment, the downlink information in the present disclosure is generated by the RRC sublayer 306.

In one subembodiment, the downlink information in the present disclosure is generated by the MAC sublayer 302.

Embodiment 4

Figure 4:
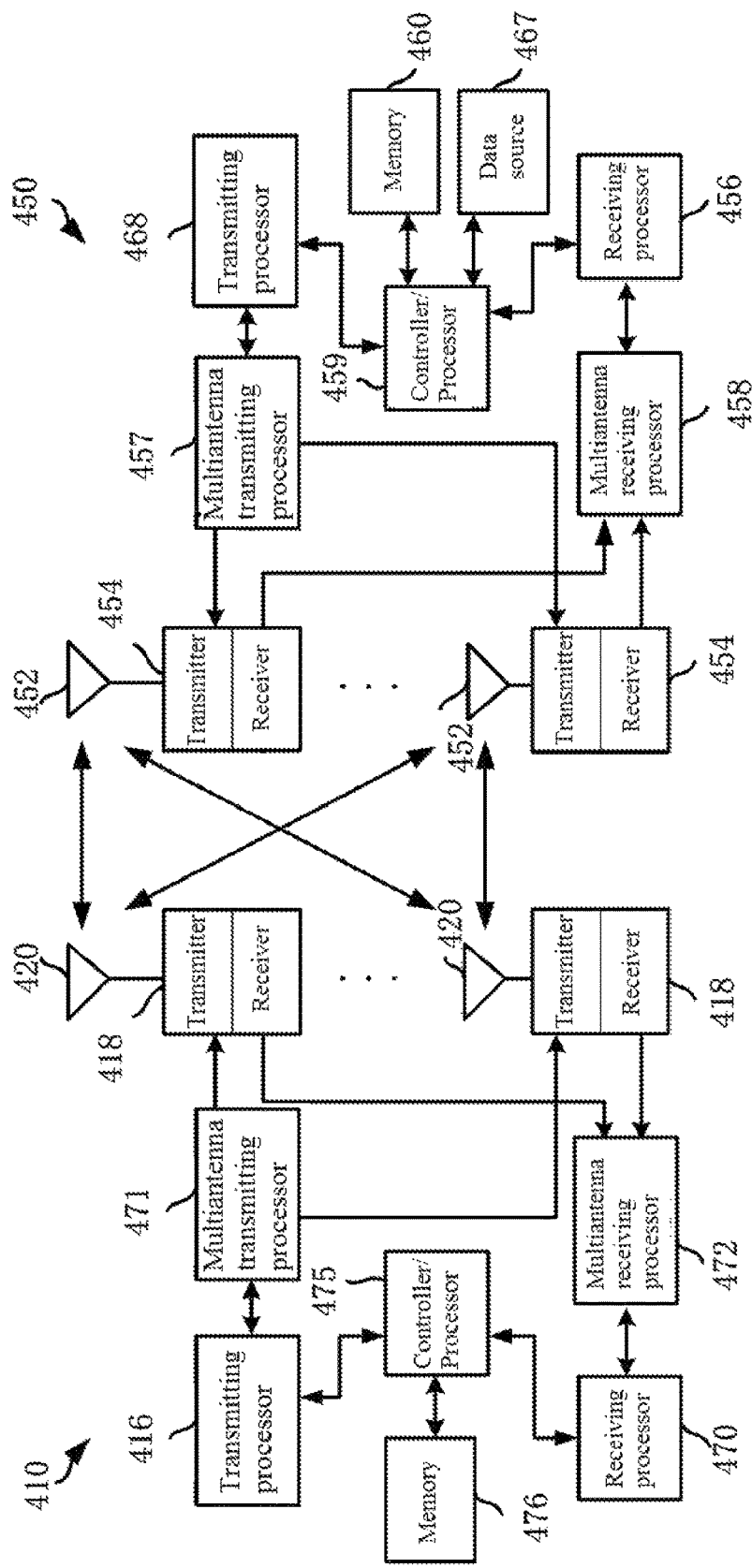
FIG. 4 is a diagram illustrating a New Radio (NR) node and a UE according to one embodiment of the present disclosure.

Embodiment 4 illustrates an example of a diagram of an NR node and a UE, as shown in FIG. 4. FIG. 4 is a block diagram of a UE 450 and a gNB 410 that are in communication with each other in an access network.

The gNB 410 includes a controller/processor 475, a memory 476, a receiving processor 470, a transmitting processor 416, a multi-antenna receiving processor 472, a multi-antenna transmitting processor 471, a transmitter/receiver 418 and an antenna 420.

The UE 450 includes a controller/processor 459, a memory 460, a data source 467, a transmitting processor 468, a receiving processor 456, a multi-antenna transmitting processor 457, a multi-antenna receiving processor 458, a transmitter/receiver 454 and antenna 452.

In Downlink (DL) transmission, at the gNB 410, a higher-layer packet from a core network is provided to the controller/processor 475. The controller/processor 475 provides a function of a layer 2. In downlink transmission, the controller/processor 475 provides header compression, encryption, packet segmentation and reordering, multiplexing between a logical channel and a transport channel, and a radio resource allocation for the UE 450 based on various priorities. The controller/processor 475 is also in charge of HARQ operation, retransmission of a lost packet, and a signaling to the UE 450. The transmitting processor 416 and the multi-antenna transmitting processor 471 perform signal processing functions used for a layer 1 (that is, physical layer). The transmitting processor 416 performs encoding and interleaving so as to enable a FEC (Forward Error Correction) and the mapping to signal clusters corresponding to various modulation scheme (i.e., BPSK, QPSK, M-PSK M-QAM, etc.) at the UE 450 side. The multi-antenna transmitting processor 471 processes the encoded and modulated symbols by a digital spatial precoding/beamforming operation to generate one or more spatial streams. The transmitting processor 416 subsequently maps each spatial stream into a subcarrier to be multiplexed with a reference signal (i.e., pilot) in time domain and/or frequency domain, and then processes it with Inverse Fast Fourier Transform (IFFT) to generate a physical channel carrying time-domain multicarrier symbol streams. Then, the multi-antenna transmitting processor 471 processes the time-domain multicarrier symbol streams by a transmitting analog precoding/beamforming operation. Each transmitter 418 converts a baseband multicarrier symbol stream provided by the multi-antenna transmitting processor 471 into a radio frequency stream and then provides it to different antennas 420.

In downlink transmission, at the UE 450, each receiver 454 receives a signal via the corresponding antenna 452. Each receiver 454 recovers the information modulated to the RF carrier and converts the radio frequency stream into a baseband multicarrier symbol stream to provide to the receiving processor 456. The receiving processor 456 and the multi-antenna receiving processor 458 perform signal processing functions of the layer 1. The multi-antenna receiving processor 458 processes the baseband multicarrier symbol stream coming from the receiver 454 by a receiving analog precoding/beamforming operation. The receiving processor 456 converts the baseband multicarrier symbol stream subjected to the receiving analog precoding/beamforming operation from time domain into frequency domain using FFT (Fast Fourier Transform). In the frequency domain, a physical layer data signal and a reference signal are demultiplexed by the receiving processor 456, wherein the reference signal is used for channel estimation, and the data signal is subjected to multi-antenna detection in the multi-antenna receiving processor 458 to recover any spatial stream targeting the UE 450. Symbols on each spatial stream are demodulated and recovered in the receiving processor 456 to generate a soft decision. Then, the receiving processor 456 decodes and de-interleaves the soft decision to recover the higher-layer data and control signal on the physical channel transmitted by the gNB 410. Next, the higher-layer data and control signal are provided to the controller/processor 459. The controller/processor 459 performs functions of the layer 2. The controller/processor 459 can be connected to the memory 460 that stores program code and data. The memory 460 can be called a computer readable media. In downlink transmission, the controller/processor 459 provides multiplexing between the transport channel and the logical channel, packet reassembling, decryption, header decompression, and control signal processing so as to recover the higher-layer packet coming from the core network. The higher-layer packet is then provided to all protocol layers above layer 2, or various control signals can be provided to the layer 3 for processing. The controller/processor 459 can also perform error detection using ACK and/or NACK protocols to support the HARQ operation.

In the uplink transmission, at the UE 450, the data source 467 provides a higher-layer packet to the controller/processor 459. The data source 467 represents all protocol layers above the L2 layer. Similar as the transmitting function of the gNB 410 described in downlink transmission, the controller/processor 459 provides header compression, encryption, packet segmentation and reordering, and multiplexing between a logical channel and a transport channel based on the radio resource allocation of the base station 410 so as to provide the functions of the layer 2 used for the control plane and user plane. The controller/processor 459 is also in charge of HARQ operation, retransmission of a lost packet, and signaling to the gNB 410. The transmitting processor 468 conducts modulation mapping and channel encoding processing; the multi-antenna transmitting processor 457 performs digital multi-antenna spatial precoding/beaming processing; and subsequently, the transmitting processor 468 modulates the generated spatial streams into a multicarrier/single-carrier symbol stream, which is subjected to an analog precoding/beamforming operation in the multi-antenna transmitting processor 457 and then is provided to different antennas 452 via the transmitter 454. Each transmitter 452 first converts the baseband symbol stream provided by the multi-antenna transmitting processor 457 into a radio frequency symbol stream and then provides the radio frequency symbol stream to the antenna 452.

In uplink transmission, the function of the gNB 410 is similar as the receiving function of the UE 450 described in the downlink transmission. Each receiver 418 receives a radio frequency signal via the corresponding antenna 420, converts the received radio frequency signal into a baseband signal, and provides the baseband signal to the multi-antenna receiving processor 472 and the receiving processor 470. The receiving processor 470 and the multi-antenna receiving processor 472 together provide functions of the layer 1. The controller/processor 475 provides functions of the layer 2. The controller/processor 475 can be connected to the memory 476 that stores program code and data. The memory 476 can be called a computer readable media. In uplink transmission, the controller/processor 475 provides de-multiplexing between the transport channel and the logical channel, packet reassembling, decryption, header decompression, and control signal processing so as to recover a higher-layer packet coming from the UE 450. The higher-layer packet, coming from the controller/processor 475, may be provided to the core network. The controller/processor 475 can also perform error detection using ACK and/or NACK protocols to support the HARQ operation.

In one embodiment, the UE 450 includes at least one processor and at least one memory. The at least one memory includes computer program codes. The at least one memory and the computer program codes are configured to be used in collaboration with the at least one processor.

In one embodiment, the UE 450 includes a memory that stores a computer readable instruction program. The computer readable instruction program generates an action when executed by at least one processor. The action includes: transmitting the first information in the present disclosure, receiving the M reference signals in the present disclosure, and receiving the downlink information in the present disclosure.

In one subembodiment, the gNB 410 includes at least one processor and at least one memory. The at least one memory includes computer program codes. The at least one memory and the computer program codes are configured to be used in collaboration with the at least one processor.

In one subembodiment, the gNB 410 includes a memory that stores a computer readable instruction program. The computer readable instruction program generates an action when executed by at least one processor. The action includes: receiving the first information in the present disclosure, transmitting the M reference signals in the present disclosure, and transmitting the downlink information in the present disclosure.

In one embodiment, the UE 450 corresponds to the UE in the present disclosure.

In one embodiment, the gNB 410 corresponds to the base station in the present disclosure.

In one embodiment, at least one of {the antenna 420, the receiver 418, the receiving processor 470, the multi-antenna receiving processor 472, the controller/processor 475} is used for receiving the first information; and at least one of {the antenna 452, the transmitter 454, the transmitting processor 468, the multi-antenna transmitting processor 457, the controller/processor 459} is used for transmitting the first information.

In one embodiment, at least one of {the antenna 452, the receiver 454, the receiving processor 456, the multi-antenna receiving processor 458, the controller/processor 459} is used for receiving the M reference signals; and at least one of {the antenna 420, the transmitter 418, the transmitting processor 416, the multi-antenna transmitting processor 471, the controller/processor 475} is used for transmitting the M reference signals.

In one embodiment, at least one of {the antenna 452, the receiver 454, the receiving processor 456, the multi-antenna receiving processor 458, the controller/processor 459} is used for receiving the downlink information; and at least one of {the antenna 420, the transmitter 418, the transmitting processor 416, the multi-antenna transmitting processor 471, the controller/processor 475} is used for transmitting the downlink information.

Embodiment 5

Figure 5:
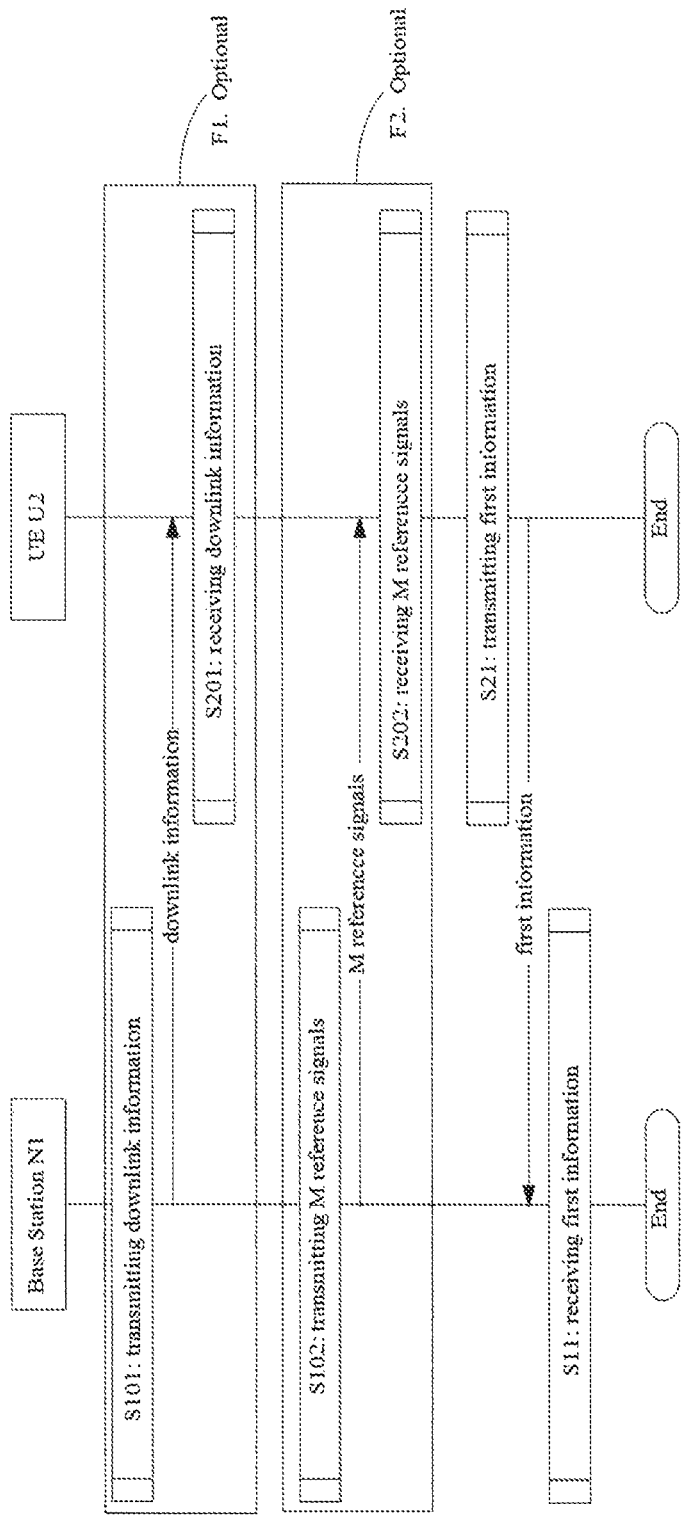
FIG. 5 is a flowchart of wireless transmission according to one embodiment of the present disclosure.

Embodiment 5 illustrates an example of a flowchart of wireless transmission, as shown in FIG. 5. In FIG. 5, a base station N1 is a maintenance base station for a serving cell of a UE U2. In FIG. 5, steps marked in box F1 and box F2 are optional.

The N1 transmits downlink information in S101, transmits M reference signals in S102, and receives first information in S11.

The U2 receives downlink information in S201, receives M reference signals in S202, and transmits first information in S21.

In embodiment 5, the first information includes at least the former two of {K first-type indexes, K1 first-type indexes, K first-type numerical values}, and the K1 first-type indexes are a subset of the K first-type indexes; the K first-type indexes are used by the N1 to determine K antenna port groups respectively, and one antenna port group includes a positive integer number of antenna ports; the U2 can receive simultaneously radio signals coming from K1 antenna port groups, the K1 antenna port groups are a subset of the K antenna port groups, the K1 first-type indexes are used by the N1 to determine the K1 antenna port groups respectively; the K first-type numerical values are used by the N1 to determine K channel qualities respectively, and the K channel qualities are one-to-one corresponding to the K antenna port groups; the K1 first-type indexes include at least one given first-type index, and a position of the given first-type index in the K first-type indexes is used by the N1 to determine whether an antenna port group corresponding to the given first-type index belongs to the K1 antenna port groups; and the K is a positive integer greater than 1, and the K1 is a positive integer greater than 1 but not greater than the K. The M reference signals are transmitted by M antenna port groups respectively, the K antenna port groups are a subset of the M antenna port groups, and the M is a positive integer not less than the K. The downlink information is used by the U2 to determine at least one of {the K, the K1}.

In one embodiment, the K first-type indexes are arranged in order.

In one embodiment, positions of the K1 first-type indexes in the K first-type indexes are default (no configuration is required).

In one embodiment, positions of the K1 first-type indexes in the K first-type indexes are configured by a high layer signaling.

In one embodiment, the K1 first-type indexes are K1 first-type indexes in the frontmost of the K first-type indexes.

In one embodiment, the K1 first-type indexes are K1 first-type indexes in the rearmost of the K first-type indexes.

In one embodiment, the K1 first-type indexes are arranged in order.

In one embodiment, the first information determines the K1.

In one embodiment, any one first-type index of the K first-type indexes is a CRI.

In one embodiment, the K first-type numerical values are arranged in order.

In one embodiment, the first information is a UCI.

In one embodiment, the first information includes one or more of {CSI, CRI, RSRP, RSRQ, CQI, PMI}.

In one embodiment, the K1 is less than the K.

In one embodiment, the K1 is equal to the K.

In one embodiment, the N1 cannot assume that the U2 can receive simultaneously radio signals coming from any two antenna port groups in the K antenna port groups that do not belong to the K1 antenna port groups.

In one embodiment, the N1 cannot assume that the U2 can receive simultaneously radio signals coming from a first antenna port group and a second antenna port group, wherein the first antenna port group is any one antenna port group of the K1 antenna port groups, and the second antenna port group is any one antenna port group in the K antenna port groups that does not belong to the K1 antenna port groups.

In one embodiment, the K antenna port groups include at least two antenna port groups that do not belong to the K1 antenna port groups, and the U2 can receive simultaneously radio signaling coming from the two antenna port groups that do not belong to the K1 antenna port groups.

In one embodiment, the U2 cannot receive simultaneously radio signals coming from any two antenna port groups in the K antenna port groups that do not belong to the K1 antenna port groups.

In one embodiment, the first information is carried by a physical layer signaling.

In one embodiment, the first information is transmitted on an uplink physical layer control channel (that is, an uplink channel capable of carrying a physical layer signaling only).

In one embodiment, the first information is transmitted on an uplink physical layer data channel (that is, an uplink channel capable of carrying physical layer data).

In one embodiment, the K first-type indexes indicate indexes of the K antenna port groups in the M antenna port groups respectively.

In one embodiment, measurements for K reference signals are used by the U2 to determine the K first-type numerical values, the K reference signals are a subset of the M reference signals, and the K reference signals are transmitted by the K antenna port groups respectively.

In one embodiment, the M reference signals include one or more of {SS, MIB/SIB, CSI-RS}.

In one embodiment, the K is less than the M.

In one embodiment, the K channel qualities include at least one first given channel quality, a difference between the first given channel quality and a first channel quality is related to the first-type numerical value corresponding to the first given channel quality, and the first channel quality is a channel quality in the K channel qualities that is not equal to the first given channel quality.

In one embodiment, a position of a first-type numerical value corresponding to the first channel quality in the K first-type numerical values is default (no configuration is required).

In one embodiment, a position of a first-type index corresponding to the first channel quality in the K first-type indexes is default (no configuration is required).

In one embodiment, the first information indicates a position of a first-type numerical value corresponding to the first channel quality in the K first-type numerical values.

In one embodiment, the first information indicates a position of a first-type index corresponding to the first channel quality in the K first-type indexes.

In one embodiment, an antenna port group corresponding to the first channel quality is one antenna port group of the K1 antenna port groups.

In one embodiment, the first-type numerical value corresponding to the first given channel quality is used by the N1 to determine the difference between the first given channel quality and the first channel quality.

In one embodiment, the first channel quality belongs to Q candidate channel qualities, a first-type numerical value corresponding to the first channel quality indicates an index of the first channel quality in the Q candidate channel qualities, wherein the Q is a positive integer greater than 1.

In one embodiment, the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to the first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

In one embodiment, a position of a first-type numerical value corresponding to the second channel quality in the K first-type numerical values is default (no configuration is required).

In one embodiment, a position of a first-type index corresponding to the second channel quality in the K first-type indexes is default (no configuration is required).

In one embodiment, the first information indicates a position of a first-type numerical value corresponding to the second channel quality in the K first-type numerical values.

In one embodiment, the first information indicates a position of a first-type index corresponding to the second channel quality in the K first-type indexes.

In one embodiment, the first-type numerical value corresponding to the second given channel quality is used by the N1 to determine the difference between the second given channel quality and the second channel quality.

In one embodiment, the second channel quality belongs to Q candidate channel qualities, a first-type numerical value corresponding to the second channel quality indicates an index of the second channel quality in the Q candidate channel qualities, wherein the Q is a positive integer greater than 1.

In one embodiment, the K first-type numerical values are arranged in order.

In one embodiment, K1 first-type numerical values and K2 first-type numerical values are arranged in order respectively; the K1 first-type numerical values and the K2 first-type numerical values are subsets of the K first-type numerical values respectively; the K1 first-type numerical values are one-to-one corresponding to the K1 channel qualities, and the K2 first-type numerical values are one-to-one corresponding to the K2 channel qualities.

In one embodiment, the downlink information is carried by a high layer signaling.

In one embodiment, the downlink information is carried by an RRC signaling.

In one embodiment, the downlink information is carried by an MAC CE signaling.

In one embodiment, the downlink information is carried by a physical layer signaling.

In one embodiment, the downlink information triggers the transmission of the first information.

In one embodiment, the downlink information is used by the U2 to determine configuration information for the first information.

In one embodiment, the downlink information is used by the U2 to determine positions of the K1 first-type indexes in the K first-type indexes.

In one embodiment, the downlink information is transmitted on a downlink physical layer data channel (that is, a downlink channel capable of carrying physical layer data).

In one embodiment, the downlink information is transmitted on a downlink physical layer control channel (that is, a downlink channel capable of carrying a physical layer signaling only).

Embodiment 6

Figure 6:
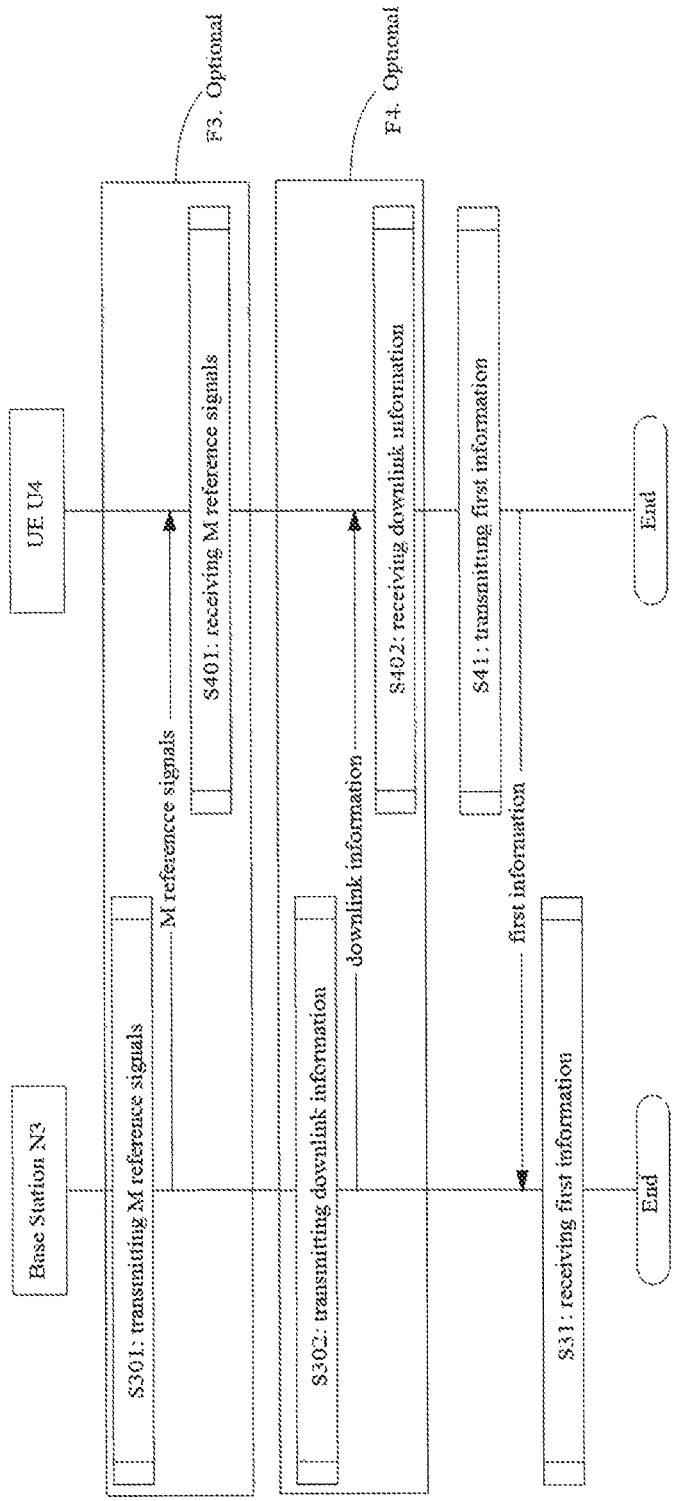
FIG. 6 is a flowchart of wireless transmission according to another embodiment of the present disclosure.

Embodiment 6 illustrates an example of a flowchart of wireless transmission, as shown in FIG. 6. In FIG. 6, a base station N3 is a maintenance base station for a serving cell of a UE U4. In FIG. 6, steps marked in box F3 and box F4 are optional.

The N3 transmits M reference signals in S301, transmits downlink information in S302, and receives first information in S31.

The U4 receives M reference signals in S401, receives downlink information in S402, and transmits first information in S41.

In Embodiment 6, the first information includes at least the former two of {K first-type indexes, K1 first-type indexes, K first-type numerical values}, and the K1 first-type indexes are a subset of the K first-type indexes; the K first-type indexes are used by the N3 to determine K antenna port groups respectively, and one antenna port group includes a positive integer number of antenna ports; the U4 can receive simultaneously radio signals coming from K1 antenna port groups, the K1 antenna port groups are a subset of the K antenna port groups, and the K1 first-type indexes are used by the N3 to determine the K1 antenna port groups respectively; the K first-type numerical values are used by the N3 to determine K channel qualities respectively, and the K channel qualities are one-to-one corresponding to the K antenna port groups; the K1 first-type indexes include at least one given first-type index, and a position of the given first-type index in the K first-type indexes is used by the N3 to determine whether an antenna port group corresponding to the given first-type index belongs to the K1 antenna port groups; and the K is a positive integer greater than 1, and the K1 is a positive integer greater than 1 but not greater than the K.

Embodiment 7

Embodiment 7 illustrates an example of a diagram of the content of first information, as shown in FIG. 7.

In embodiment 7, the first information includes {K1 first-type indexes, K2 first-type indexes, K1 first-type numerical values, K2 first-type numerical values}. The K1 first-type indexes and the K2 first-type indexes constitute the K first-type indexes in the present disclosure. The K1 first-type numerical values and the K2 first-type numerical values constitute the K first-type numerical values in the present disclosure. The K1 first-type indexes and the K1 first-type numerical values are in one to one correspondence. The K2 first-type indexes and the K2 first-type numerical values are in one to one correspondence. The K first-type indexes are used for determining K antenna port groups respectively, and one antenna port group includes a positive integer number of antenna ports. The UE in the present disclosure can receive simultaneously radio signals coming from K1 antenna port groups, the K1 antenna port groups are a subset of the K antenna port groups, and the K1 first-type indexes are used for determining the K1 antenna port groups respectively. The K first-type indexes are arranged in order, and positions of the K1 first-type indexes in the K first-type indexes are by default K1 first-type indexes in the frontmost of the K first-type indexes. The K first-type numerical values are arranged in order, and positions of the K1 first-type numerical values in the K first-type numerical values are by default K1 first-type numerical values in the frontmost of the K first-type numerical values. The K is a positive integer greater than 1. The K1 is a positive integer greater than 1 but not greater than the K. The K2 is equal to the K minus the K1.

In one embodiment, for any one given first-type numerical value of the K first-type numerical values, an index of a first-type index corresponding to the given first-type numerical value in the K first-type indexes is equal to an index of the given first-type numerical value in the K first-type numerical values.

In one embodiment, the K1 first-type indexes are K1 first-type indexes in the frontmost of the K first-type indexes.

In one embodiment, indexes of the K1 first-type indexes in the K first-type indexes are 0 to (K1−1) respectively.

In one embodiment, the K1 first-type numerical values are the K1 first-type numerical values in the frontmost of the K first-type numerical values.

In one embodiment, indexes of the K1 first-type numerical values in the K first-type numerical values are 0 to (K1−1) respectively.

In one embodiment, the K1 first-type indexes are arranged in order.

In one embodiment, the K2 first-type indexes are arranged in order.

In one embodiment, the K1 first-type numerical values are arranged in order.

In one embodiment, the K2 first-type numerical values are arranged in order.

In one embodiment, the K1 is less than the K.

In one embodiment, the K1 is equal to the K.

Embodiment 8

Figure 8:
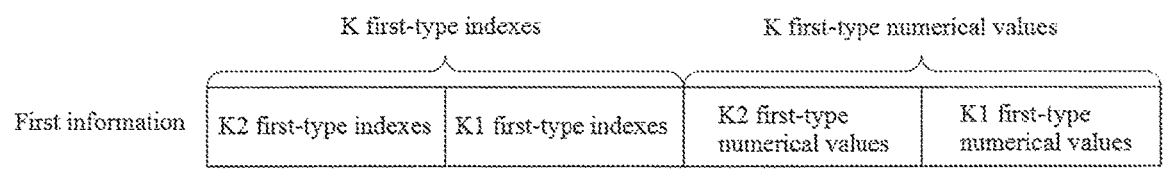
FIG. 8 is a diagram illustrating the content of first information according to another embodiment of the present disclosure.

Embodiment 8 illustrates an example of a diagram of the content of first information, as shown in FIG. 8.

In embodiment 8, the first information includes {K1 first-type indexes, K2 first-type indexes, K1 first-type numerical values, K2 first-type numerical values}. The K1 first-type indexes and the K2 first-type indexes constitute the K first-type indexes in the present disclosure. The K1 first-type numerical values and the K2 first-type numerical values constitute the K first-type numerical values in the present disclosure. The K1 first-type indexes and the K1 first-type numerical values are in one to one correspondence. The K2 first-type indexes and the K2 first-type numerical values are in one to one correspondence. The K first-type indexes are used for determining K antenna port groups respectively, and one antenna port group includes a positive integer number of antenna ports. The UE in the present disclosure can receive simultaneously radio signals coming from K1 antenna port groups, the K1 antenna port groups are a subset of the K antenna port groups, and the K1 first-type indexes are used for determining the K1 antenna port groups respectively. The K first-type indexes are arranged in order, and positions of the K1 first-type indexes in the K first-type indexes are by default K1 first-type indexes in the rearmost of the K first-type indexes. The K first-type numerical values are arranged in order, and positions of the K1 first-type numerical values in the K first-type numerical values are by default K1 first-type numerical values in the rearmost of the K first-type numerical values. The K is a positive integer greater than 1. The K1 is a positive integer greater than 1 but not greater than the K. The K2 is equal to the K minus the K1.

In one embodiment, the K1 first-type indexes are K1 first-type indexes in the rearmost of the K first-type indexes.

In one embodiment, indexes of the K1 first-type indexes in the K first-type indexes are (K−K1) to (K−1) respectively.

In one embodiment, the K1 first-type numerical values are the K1 first-type numerical values in the rearmost of the K first-type numerical values.

In one embodiment, indexes of the K1 first-type numerical values in the K first-type numerical values are (K−K1) to (K−1) respectively.

Embodiment 9

Figure 9:
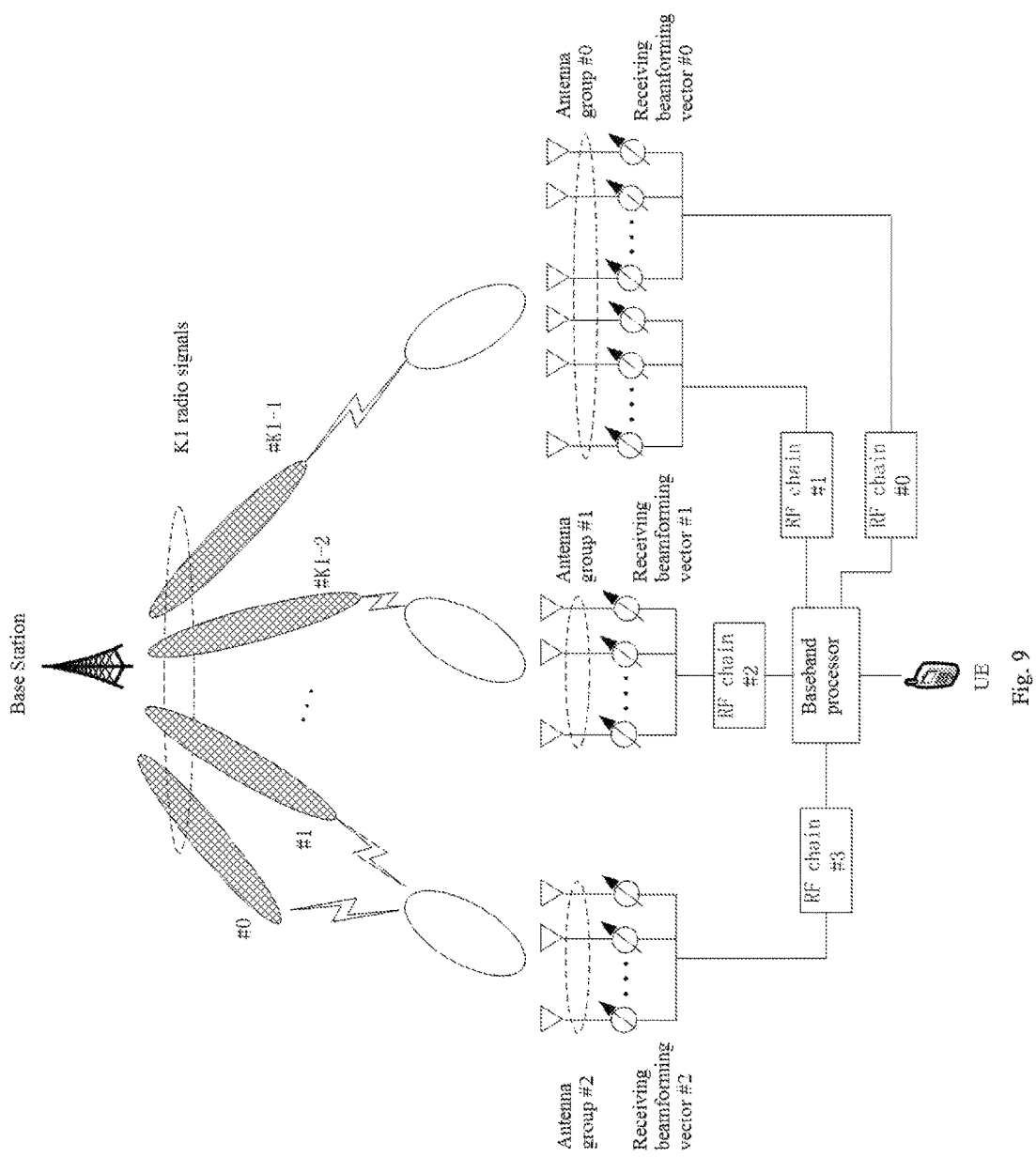
FIG. 9 is a diagram illustrating a situation in which a UE receives simultaneously radio signals coming from K1 antenna port groups according to one embodiment of the present disclosure.

Embodiment 9 illustrates an example of a diagram of a situation in which a UE receives simultaneously radio signals coming from K1 antenna port groups, as shown in FIG. 9.

In Embodiment 9, K1 radio signals are transmitted by the K1 antenna port groups respectively, and the UE can receive the K1 radio signals simultaneously. In FIG. 9, indexes of the K1 radio signals are #{0, 1, . . . , K1−2, K1−1} respectively.

In one embodiment, the act that the UE can receive the K1 radio signals simultaneously refers that: the UE can receive the K1 radio signals on one same multi-carrier symbol.

In one subembodiment, the multi-carrier symbol is an OFDM symbol.

In one subembodiment, the multi-carrier symbol is a DFT-S-OFDM symbol.

In one subembodiment, the multi-carrier symbol is a FBMC symbol.

In one embodiment, the UE can receive simultaneously at least two radio signals of the K1 radio signals using a same receiving beamforming vector. For example, in FIG. 9, the radio signal #0 and the radio signal #1 in the K1 radio signals are received by a same receiving beamforming vector.

In one embodiment, the UE can receive simultaneously at least two radio signals of the K1 radio signals using different receiving beamforming vectors. For example, in FIG. 9, the radio signal #0, the radio signal #K1−2, and the radio signal #K1−1 in the K1 radio signals are received by different receiving beamforming vectors.

In one subembodiment, the different receiving beamforming vectors are applied to different antenna groups, one antenna group includes a positive integer number of antennas, and the different antenna groups correspond to different RF chains.

In one reference embodiment of the above subembodiment, there is no antenna that belongs to different antenna groups simultaneously.

In one reference embodiment of the above subembodiment, in all antenna groups configured for the UE, there are at least two antenna groups including a same number of antennas.

In one reference embodiment of the above subembodiment, in all antenna groups configured for the UE, there are at least two antenna groups including different numbers of antennas.

In one reference embodiment of the above subembodiment, in all antenna groups configured for the UE, there are at least two antenna groups corresponding to a same number of RF chains.

In one reference embodiment of the above subembodiment, in all antenna groups configured for the UE, there are at least two antenna groups corresponding to different numbers of RF chains.

In one embodiment, the K antenna port groups in the present disclosure include a third antenna port group and a fourth antenna port group, the UE can receive simultaneously radio signals coming from the third antenna port group and the fourth antenna port group, and the third antenna port group and the fourth antenna port group do not belong to the K1 antenna port groups.

In one embodiment, the UE cannot receive simultaneously radio signals coming from any two antenna port groups in the K antenna port groups in the present disclosure that do not belong to the K1 antenna port groups.

Embodiment 10

Figure 10:
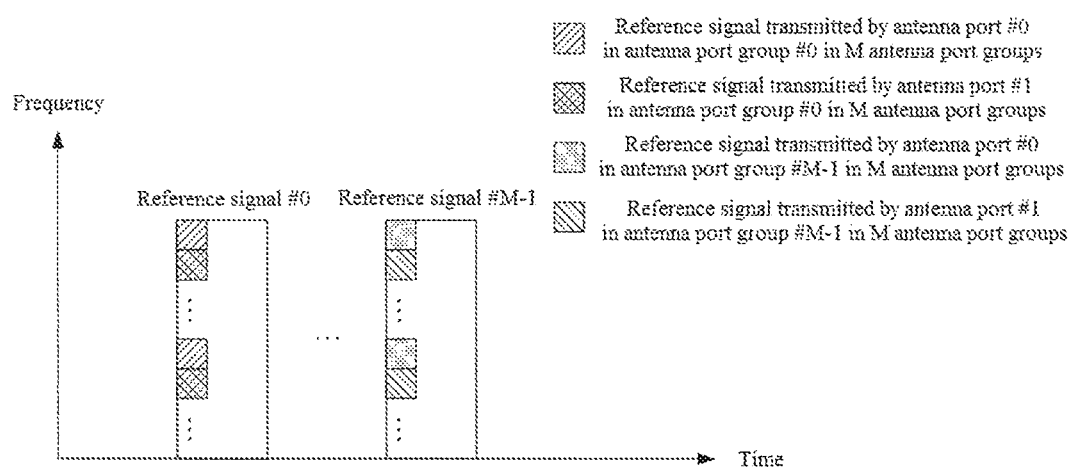
FIG. 10 is a diagram illustrating the resource mapping of M reference signals in time-frequency domain according to one embodiment of the present disclosure.

Embodiment 10 illustrates an example of a diagram of the resource mapping of M reference signals in time-frequency domain, as shown in FIG. 10.

In Embodiment 10, the M reference signals are transmitted by M antenna port groups respectively, and time domain resources occupied by any two of the M reference signals are orthogonal (non-overlapping). One antenna port group includes a positive integer number of antenna ports. Any one given reference signal in the M reference signals includes a positive integer number of sub-signals, and the positive integer number of sub-signals are transmitted by a positive integer number of antenna ports included in an antenna port group corresponding to the given reference signal. In FIG. 10, indexes of the M reference signals are #{0, . . . , M−1} respectively.

As shown in FIG. 10, an antenna port group corresponding to the reference signal #0 and an antenna port group corresponding to the reference signal #M−1 each include 2 antenna ports; the reference signal #0 and the reference signal #M−1 each include 2 subsignals; the 2 subsignals included in the reference signal #0 are transmitted by the 2 antenna ports included in the antenna port group corresponding to the reference signal #0, and the 2 subsignals included in the reference signal #M−1 are transmitted by the 2 antenna ports included in the antenna port group corresponding to the reference signal #M−1.

In one embodiment, the M reference signals appear many times in time domain.

In one subembodiment, time interval between any two adjacent appearances of the M reference signals in time domain is the same.

In one embodiment, the M reference signals appear one time only in time domain.

In one embodiment, the M reference signals are aperiodic.

In one embodiment, the M reference signals are periodic.

In one embodiment, the M reference signals are semi-persistent.

In one embodiment, the M reference signals are wideband.

In one embodiment, a system bandwidth is divided into a positive integer number of frequency-domain areas, any one of the M reference signals appears on all of the positive integer number of frequency-domain areas, and any one of the positive integer number of frequency-domain areas includes a positive integer number of continuous subcarriers.

In one subembodiment, any two of the positive integer number of frequency-domain areas include a same number of subcarriers.

In one embodiment, the M reference signals are narrowband.

In one embodiment, a system bandwidth is divided into a positive integer number of frequency-domain areas, any one of the M reference signals appears on part of the positive integer number of frequency-domain areas only, and any one of the positive integer number of frequency-domain areas includes a positive integer number of continuous subcarriers.

In one subembodiment, any two of the positive integer number of frequency-domain areas include a same number of subcarriers.

In one embodiment, any two of the M antenna port groups include a same number of antenna ports.

In one embodiment, the M antenna port groups include at least two antenna port groups that have different numbers of antenna ports.

In one embodiment, the M antenna port groups include at least one antenna port group that has one antenna port.

In one embodiment, the M antenna port groups include at least one antenna port group that has more than one antenna port.

Embodiment 11

Figure 11:
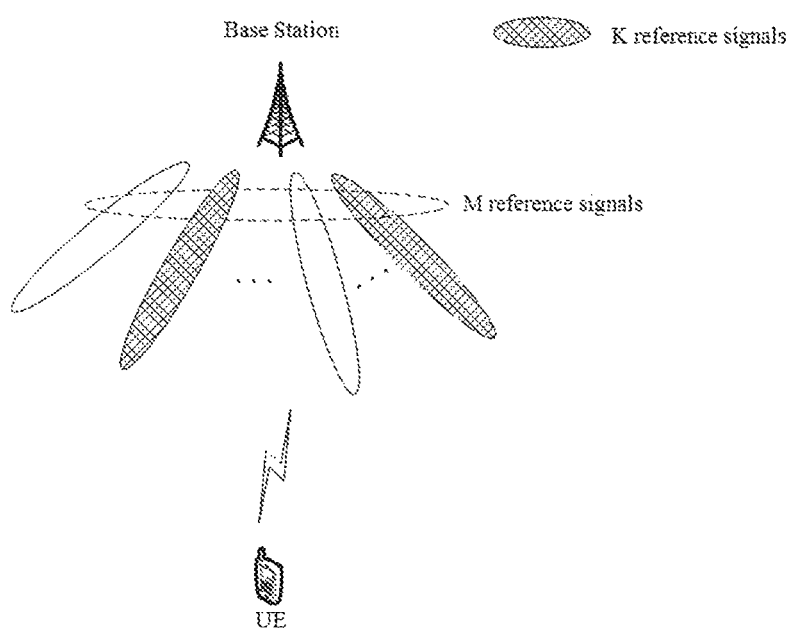
FIG. 11 is a diagram illustrating a relationship between K antenna port groups and M antenna port groups according to one embodiment of the present disclosure.

Embodiment 11 illustrates an example of a diagram of a relationship between K antenna port groups and M antenna port groups, as shown in FIG. 11.

In Embodiment 11, the K antenna port groups are a subset of the M antenna port groups. M reference signals are transmitted by the M antenna port groups respectively, and K reference signals are transmitted by the K antenna port groups respectively. The K reference signals are a subset of the M reference signals. The K is a positive integer greater than 1, and the M is a positive integer not less than the K. Measurements of the M reference signals are used by the UE in the present disclosure to determine the K antenna port groups. Measurements of the K reference signals are used by the UE in the present disclosure to determine the K first-type numerical values in the present disclosure, and the K first-type numerical values are used by the base station in the present disclosure to determine the K channel qualities respectively.

In one embodiment, measurements of the M reference signals are used for determining M reference channel qualities respectively, K reference channel qualities are a subset of the M reference channel qualities, and measurements of the K reference signals are used for determining the K reference channel qualities respectively.

In one subembodiment, any one reference channel quality of the K reference channel qualities is greater than any one reference channel quality in the M reference channel qualities that does not belong to the K reference channel qualities.

In one subembodiment, any one reference channel quality of the K reference channel qualities is greater than a first threshold, and the first threshold is a positive real number.

In one subembodiment, the K reference channel qualities are used by the UE in the present disclosure to determine the K first-type numerical values.

In one subembodiment, the K channel qualities are quantized values of the K reference channel qualities respectively.

In one subembodiment, any one reference channel quality of the M reference channel qualities is an RSRP.

In one subembodiment, any one reference channel quality of the M reference channel qualities is an RSRQ.

In one subembodiment, any one reference channel quality of the M reference channel qualities is a CQI.

Embodiment 12

Figure 12:
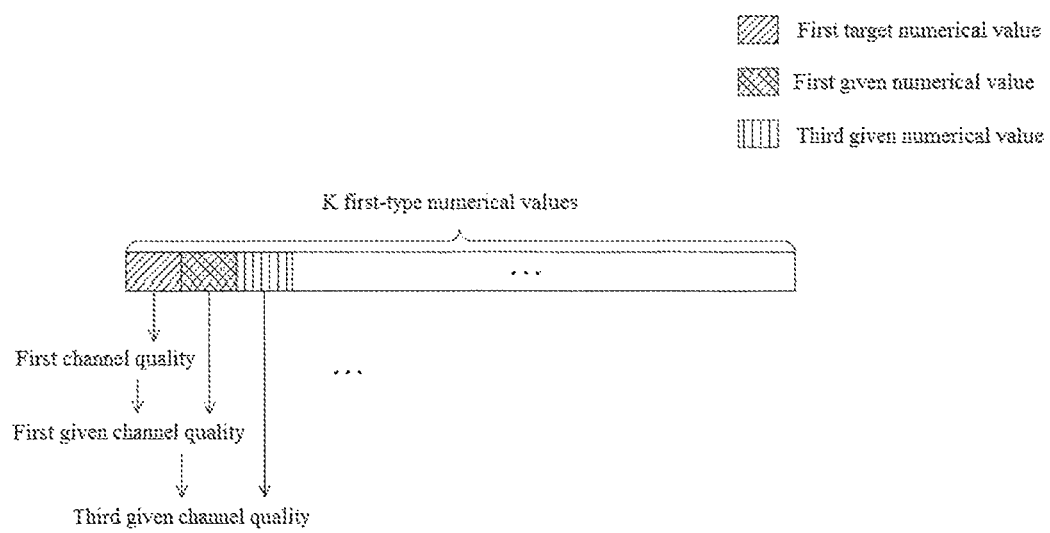
FIG. 12 is a diagram illustrating a relationship between a first given channel quality and a first channel quality according to one embodiment of the present disclosure.

Embodiment 12 illustrates an example of a diagram of a relationship between a first given channel quality and a first channel quality, as shown in FIG. 12.

In Embodiment 12, the K first-type numerical values in the present disclosure are used for determining the K channel qualities in the present disclosure respectively; the K channel qualities include at least one first given channel quality, a difference between the first given channel quality and a first channel quality is related to a first given numerical value, and the first channel quality is a channel quality in the K channel qualities that is not equal to the first given channel quality; the first given numerical value is the first-type numerical value corresponding to the first given channel quality. A first-type numerical value corresponding to the first channel quality is a first target numerical value.

In one embodiment, the K first-type numerical values are arranged in order.

In one embodiment, a position of the first target numerical value in the K first-type numerical values is default (no configuration is required).

In one embodiment, the first target numerical value is a first first-type numerical value in the K first-type numerical values.

In one embodiment, an index of the first target numerical value in the K first-type numerical values is equal to 0.

In one embodiment, the first information in the present disclosure indicates a position of the first target numerical value in the K first-type numerical values.

In one embodiment, the first channel quality belongs to Q candidate channel qualities, the first target numerical value indicates an index of the first channel quality in the Q candidate channel qualities, wherein the Q is a positive integer greater than 1.

In one subembodiment, the first channel quality is unrelated to a first-type numerical values in the K first-type numerical values other than the first target numerical value.

In one subembodiment, the first given numerical value is used for determining the difference between the first given channel quality and the first channel quality.

In one embodiment, the difference between the first given channel quality and the first channel quality belongs to Q1 candidate differences, the given numerical value indicates an index of the difference between the first given channel quality and the first channel quality in the Q1 candidate differences, wherein the Q1 is a positive integer greater than 1.

In one embodiment, the first given numerical value is used for determining a ratio of the difference between the first given channel quality and the first channel quality to a first quantization step, wherein the first quantization step is a positive real number.

In one subembodiment, the first quantization step is configured by a high layer signaling.

In one subembodiment, the first information in the present disclosure is used for determining the first quantization step.

In one subembodiment, a ratio of the difference between the first given channel quality and the first channel quality to the first quantization step is an integer.

In one subembodiment, the first given numerical value is used for determining a first coefficient, and the first given channel quality is equal to the first channel quality minus a product of the first coefficient and the first quantization step, wherein the first coefficient is a non-negative integer.

In one embodiment, the K channel qualities include at least one third given channel quality, a difference between the third given channel quality and the first given channel quality is related to a third given numerical value, wherein the third given numerical value is a first-type numerical value corresponding to the third given channel quality.

In one subembodiment, the third given numerical value is used for determining the difference between the third given channel quality and the first given channel quality.

In one embodiment, values of channel qualities corresponding to the K first-type numerical value decrease successively.

In one embodiment, the first channel quality is a largest channel quality in the K channel qualities.

In one embodiment, the first given channel quality is the second largest channel quality in the K channel qualities.

Embodiment 13

Figure 13:
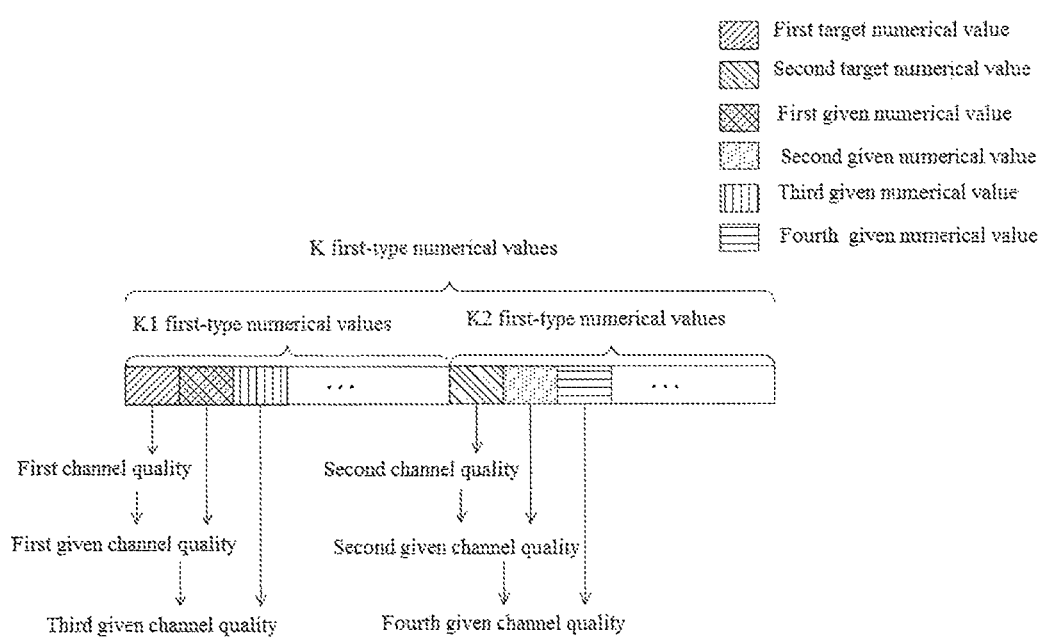
FIG. 13 is a diagram illustrating a relationship between a first given channel quality and a first channel quality and a relationship between a second given channel quality and a second channel quality according to one embodiment of the present disclosure.

Embodiment 13 illustrates an example of a diagram of a relationship between a first given channel quality and a first channel quality and a relationship between a second given channel quality and a second channel quality, as shown in FIG. 13.

In Embodiment 13, the K first-type numerical values in the present disclosure consists of K1 first-type numerical values and K2 first-type numerical values, and the sum of K1 and K2 is equal to K. The K1 first-type numerical values are used for determining the K1 channel qualities in the present disclosure respectively; and the K2 first-type numerical values are used for determining the K2 channel qualities in the present disclosure respectively. The K1 channel qualities include at least one first given channel quality, a difference between the first given channel quality and a first channel quality is related to a first given numerical value, and the first channel quality is a channel quality in the K channel qualities that is not equal to the first given channel quality; and the first given numerical value is the first-type numerical value corresponding to the first given channel quality. The K2 channel qualities include at least one second given channel quality, a difference between the second given channel quality and a second channel quality is related to a second given numerical value, and the second channel quality is a channel quality in the K2 channel qualities that is not equal to the second given channel quality; and the second given numerical value is the first-type numerical value corresponding to the second given channel quality. A first-type numerical value corresponding to the first channel quality is a first target numerical value. A first-type numerical value corresponding to the second channel quality is a second target numerical value.

In one embodiment, the intersection of the K1 channel qualities and the K2 channel qualities is a null set, that is to say, there is no channel quality that belongs to both the K1 channel qualities and the K2 channel qualities.

In one embodiment, the intersection of the K1 first-type numerical values and the K2 first-type numerical values is a null set, that is to say, there is no first-type numerical value that belongs to both the K1 first-type numerical values and the K2 first-type numerical values.

In one embodiment, the K first-type numerical values are arranged in order.

In one embodiment, positions of the K1 first-type numerical values in the K first-type numerical values are default (no configuration is required).

In one embodiment, the K1 first-type numerical values are the K1 first-type numerical values in the frontmost of the K first-type numerical values.

In one embodiment, the first information in the present disclosure indicates positions of the K1 first-type numerical values in the K first-type numerical values.

In one embodiment, the K1 first-type numerical values are arranged in order.

In one embodiment, a position of the first target numerical value in the K1 first-type numerical values is default (no configuration is required).

In one embodiment, the first target numerical value is a first first-type numerical value in the K1 first-type numerical value.

In one embodiment, an index of the first target numerical value in the K1 first-type numerical values is equal to 0.

In one embodiment, the first information in the present disclosure indicates a position of the first target numerical value in the K1 first-type numerical values.

In one embodiment, the K2 first-type numerical values are arranged in order.

In one embodiment, a position of the second target numerical value in the K2 first-type numerical values is default (no configuration is required).

In one embodiment, the second target numerical value is a first first-type numerical value in the K2 first-type numerical value.

In one embodiment, an index of the second target numerical value in the K2 first-type numerical values is equal to 0.

In one embodiment, the first information in the present disclosure indicates a position of the second target numerical value in the K2 first-type numerical values.

In one embodiment, the K2 channel qualities include at least one channel quality that is unrelated to any one of the K1 first-type numerical values.

In one embodiment, any one of the K2 channel qualities is unrelated to any one of the K1 first-type numerical values.

In one embodiment, the K1 channel qualities include at least one channel quality that is unrelated to any one of the K2 first-type numerical values.

In one embodiment, any one of the K1 channel qualities is unrelated to any one of the K2 first-type numerical values.

In one embodiment, the second channel quality is unrelated to a first-type numerical values in the K first-type numerical values other than the second target numerical value.

In one embodiment, the second channel quality belongs to Q candidate channel qualities, and the second target numerical value indicates an index of the second channel quality in the Q candidate channel qualities, wherein the Q is a positive integer greater than 1.

In one embodiment, the second given numerical value is used for determining the difference between the second given channel quality and the second channel quality.

In one embodiment, the difference between the second given channel quality and the second channel quality belongs to Q2 candidate differences, and the second given numerical value indicates an index of the difference between the second given channel quality and the second channel quality in the Q2 candidate differences, wherein the Q2 is a positive integer greater than 1

In one embodiment, the second given numerical value is used for determining a ratio of the difference between the second given channel quality and the second channel quality to a second quantization step, wherein the second quantization step is a positive real number.

In one subembodiment, the second quantization step is configured by a high layer signaling.

In one subembodiment, the first information in the present disclosure is used for determining the second quantization step.

In one subembodiment, a ratio of the difference between the second given channel quality and the second channel quality to the second quantization step is an integer.

In one subembodiment, the second given numerical value is used for determining a second coefficient, and the second given channel quality is equal to the second channel quality minus a product of the second coefficient and the second quantization step, wherein the second coefficient is a non-negative integer.

In one embodiment, the K1 channel qualities include at least one third given channel quality, and a difference between the third given channel quality and the first given channel quality is related to a third given numerical value, wherein the third given numerical value is a first-type numerical value corresponding to the third given channel quality.

In one subembodiment, the third given numerical value is used for determining the difference between the third given channel quality and the first given channel quality.

In one embodiment, the K2 channel qualities include at least one fourth given channel quality, and a difference between the fourth given channel quality and the second given channel quality is related to a fourth given numerical value, wherein the fourth given numerical value is a first-type numerical value corresponding to the fourth given channel quality.

In one subembodiment, the fourth given numerical value is used for determining the difference between the fourth given channel quality and the second given channel quality.

In one embodiment, values of channel qualities corresponding to the K1 first-type numerical value decrease successively.

In one embodiment, values of channel qualities corresponding to the K2 first-type numerical value decrease successively.

In one embodiment, the first channel quality is a largest channel quality in the K1 channel qualities.

In one embodiment, the second channel quality is a largest channel quality in the K2 channel qualities.

In one embodiment, the first given channel quality is a second largest channel quality in the K1 channel qualities.

In one embodiment, the second given channel quality is a second largest channel quality in the K2 channel qualities.

Embodiment 14

Figure 14:
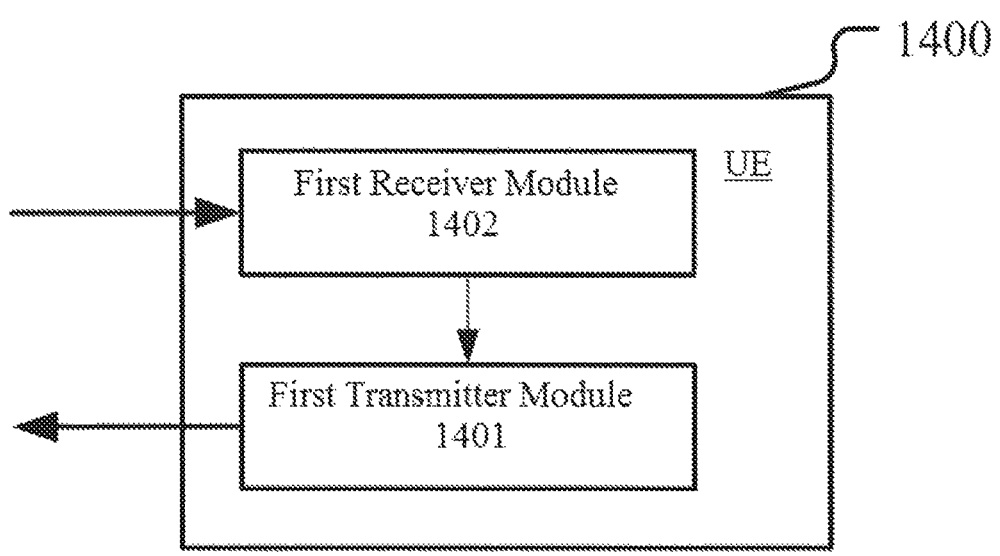
FIG. 14 is a structure block diagram illustrating a processing device in a UE according to one embodiment of the present disclosure.

Embodiment 14 illustrates an example of a structure block diagram of a processing device in a UE, as shown in FIG. 14. In FIG. 14, the processing device 1400 in the UE is mainly composed of a first transmitter module 1401 and a first receiver module 1402.

In Embodiment 14, the first transmitter module 1401 transmits first information, and the first receiver module 1402 receives M reference signals.

In Embodiment 14, the first information includes at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group includes a positive integer number of antenna ports; the UE can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K. The M reference signals are transmitted by M antenna port groups respectively, the K antenna port groups are a subset of the M antenna port groups, and the M is a positive integer not less than the K.

In one embodiment, the K channel qualities include at least one first given channel quality, a difference between the first given channel quality and a first channel quality is related to a first-type numerical value corresponding to the first given channel quality, and the first channel quality is a channel quality in the K channel qualities that is not equal to the first given channel quality.

In one subembodiment, the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to a first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

In one reference embodiment of the above subembodiment, K1 first-type numerical values and K2 first-type numerical values are arranged in order respectively, the K1 first-type numerical values and the K2 first-type numerical values are subsets of the K first-type numerical values respectively, the K1 first-type numerical values are one-toone corresponding to the K1 channel qualities, and the K2 first-type numerical values are one-to-one corresponding to the K2 channel qualities.

In one embodiment, the K first-type numerical values are arranged in order.

In one embodiment, the first receiver module 1402 further receives downlink information, wherein the downlink information is used for determining at least one of {the K, the K1}.

In one embodiment, the first transmitter module 1401 includes at least one of the {antenna 452, transmitter 454, transmitting processor 468, multi-antenna transmitting processor 457, controller/processor 459, memory 460, data source 467} mentioned in Embodiment 4.

In one embodiment, the first receiver module 1402 includes at least one of the {antenna 452, receiver 454, receiving processor 456, multi-antenna receiving processor 458, controller/processor 459, memory 460, data source 467} mentioned in Embodiment 4.

Embodiment 15

Figure 15:
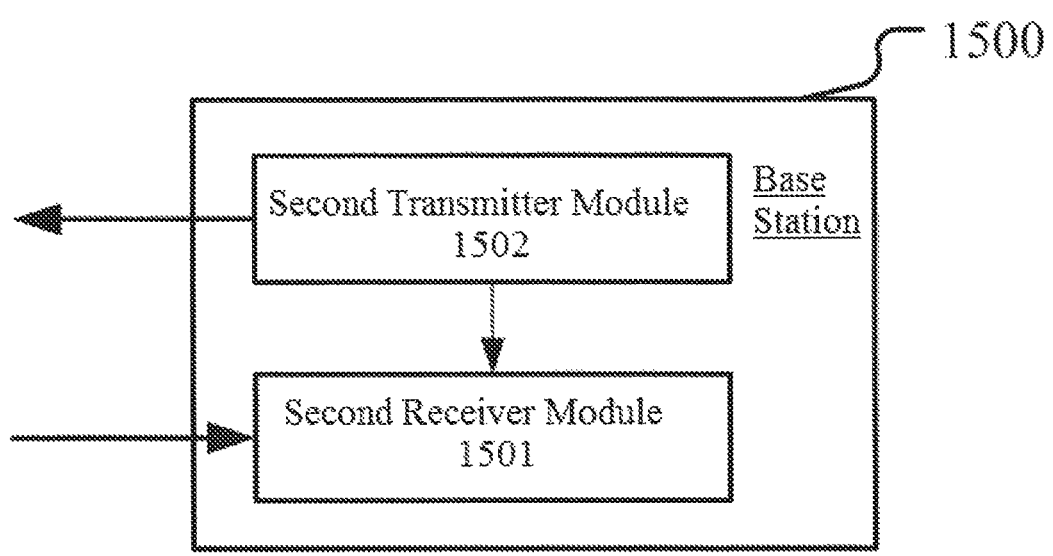
FIG. 15 is a structure block diagram illustrating a processing device in a base station according to one embodiment of the present disclosure.

Embodiment 15 illustrates an example of a structure block diagram of a processing device in a base station, as shown in FIG. 15. In FIG. 15, the processing device 1500 in the base station is mainly composed of a second receiver module 1501 and a second transmitter module 1502.

In Embodiment 15, the second receiver module 1501 receives first information, and the second transmitter module 1502 transmits M reference signals.

In Embodiment 15, the first information includes at least the former two of {K first-type indexes, K1 first-type indexes, K first-type numerical values}, and the K1 first-type indexes are a subset of the K first-type indexes; the K first-type indexes are used by the base station to determine K antenna port groups respectively, and one antenna port group includes a positive integer number of antenna ports; the transmitter of the first information can receive simultaneously radio signals coming from K1 antenna port groups, the K1 antenna port groups are a subset of the K antenna port groups, the K1 first-type indexes are used by the base station to determine the K1 antenna port groups respectively; the K first-type numerical values are used by the base station to determine K channel qualities respectively, and the K channel qualities are one-to-one corresponding to the K antenna port groups; the K1 first-type indexes include at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K. The M reference signals are transmitted by M antenna port groups respectively, the K antenna port groups are a subset of the M antenna port groups, and the M is a positive integer not less than the K.

In one embodiment, the K channel qualities include at least one first given channel quality, a difference between the first given channel quality and a first channel quality is related to a first-type numerical value corresponding to the first given channel quality, and the first channel quality is a channel quality in the K channel qualities that is not equal to the first given channel quality.

In one subembodiment, the first channel quality is one channel quality of K1 channel qualities, and the K1 channel qualities are channel qualities in the K channel qualities that are corresponding to the K1 antenna port groups respectively; K2 channel qualities include at least one second given channel quality, and a difference between the second given channel quality and a second channel quality is related to a first-type numerical value corresponding to the second given channel quality; the K2 channel qualities consist of channel qualities in the K channel qualities that do not belong to the K1 channel qualities, and the second channel quality is a channel quality in the K2 channel qualities that is not equal to the second given channel quality; and the K2 is equal to the K minus the K1.

In one reference embodiment of the above subembodiment, K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

In one embodiment, the K first-type numerical values are arranged in order.

In one embodiment, the second transmitter module 1502 further transmits downlink information, wherein the downlink information is used for determining at least one of {the K, the K1}.

In one embodiment, the second receive module 1501 includes at least one of the {antenna 420, receiver 418, receiving processor 470, multi-antenna receiving processor 472, controller/processor 475, memory 476} mentioned in Embodiment 4.

In one embodiment, the second transmitter module 1502 includes at least one of the {antenna 420, transmitter 418, transmitting processor 416, multi-antenna transmitting processor 471, controller/processor 475, memory 476} mentioned in Embodiment 4.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things, REID terminals, NB-IOT terminals, Machine Type Communication (MTC) terminals, enhanced MTC (eMTC) terminals, data cards, low-cost mobile phones, low-cost tablet computers, and other radio communication equipment. The base station or system equipment in the present application includes but not limited to macro-cellular base stations, micro-cellular base stations, home base stations, relay base station, gNB, TRP, and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a User Equipment (UE) for wireless communication, comprising:
    transmitting first information;
    wherein the first information comprises at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group comprises a positive integer number of antenna ports; the UE can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes comprise at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

2. The method according to claim 1, comprising:
    receiving M reference signals;
    wherein the M reference signals are transmitted by M antenna port groups respectively, the K antenna port groups are a subset of the M antenna port groups, and the M is a positive integer not less than the K.

3. The method according to claim 1, wherein the K channel qualities comprise at least one first given channel quality, a difference between the first given channel quality and a first channel quality is related to a first-type numerical value corresponding to the first given channel quality, and the first channel quality is a channel quality in the K channel qualities that is not equal to the first given channel quality; or, the K first-type numerical values are arranged in order.

4. The method according to claim 3, wherein the first channel quality is one channel quality of K1 channel qualities, the K1 channel qualities are channel qualities in the K channel qualities that are corresponding to the K1 antenna port groups respectively, K2 channel qualities consist of channel qualities in the K channel qualities that do not belong to the K1 channel qualities, and the K2 is equal to the K minus the K1; the K2 channel qualities comprise at least one second given channel quality, a difference between the second given channel quality and a second channel quality is related to a first-type numerical value corresponding to the second given channel quality, and the second channel quality is a channel quality in the K2 channel qualities that is not equal to the second given channel quality; or, K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

5. The method according to claim 1, comprising:
    receiving downlink information;
    wherein the downlink information is used for determining at least one of {the K, the K1}.

6. A method in a base station for wireless communication, comprising:
    receiving first information;
    wherein the first information comprises at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group comprises a positive integer number of antenna ports; the transmitter of the first information can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes comprise at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

7. The method according to claim 6, comprising:
    transmitting M reference signals;
    wherein the M reference signals are transmitted by M antenna port groups respectively, the K antenna port groups are a subset of the M antenna port groups, and the M is a positive integer not less than the K.

8. The method according to claim 6, wherein the K channel qualities comprise at least one first given channel quality, a difference between the first given channel quality and a first channel quality is related to a first-type numerical value corresponding to the first given channel quality, and the first channel quality is a channel quality in the K channel qualities that is not equal to the first given channel quality; or, the K first-type numerical values are arranged in order.

9. The method according to claim 8, wherein the first channel quality is one channel quality of K1 channel qualities, the K1 channel qualities are channel qualities in the K channel qualities that are corresponding to the K1 antenna port groups respectively, K2 channel qualities consist of channel qualities in the K channel qualities that do not belong to the K1 channel qualities, and the K2 is equal to the K minus the K1; the K2 channel qualities comprise at least one second given channel quality, a difference between the second given channel quality and a second channel quality is related to a first-type numerical value corresponding to the second given channel quality, and the second channel quality is a channel quality in the K2 channel qualities that is not equal to the second given channel quality; or, K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

10. The method according to claim 6, comprising:
    transmitting downlink information;
    wherein the downlink information is used for determining at least one of {the K, the K1}.

11. A UE device for wireless communication, comprising:
a first transmitter module, to transmit first information;
wherein the first information comprises at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group comprises a positive integer number of antenna ports; the UE can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes comprise at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

12. The UE device according to claim 11, comprising:
a first receiver module, to receive M reference signals;
wherein the M reference signals are transmitted by M antenna port groups respectively, the K antenna port groups are a subset of the M antenna port groups, and the M is a positive integer not less than K.

13. The UE device according to claim 11, wherein the K channel qualities comprise at least one first given channel quality, a difference between the first given channel quality and a first channel quality is related to a first-type numerical value corresponding to the first given channel quality, and the first channel quality is a channel quality in the K channel qualities that is not equal to the first given channel quality; or, the K first-type numerical values are arranged in order.

14. The UE device according to claim 13, wherein the first channel quality is one channel quality of K1 channel qualities, the K1 channel qualities are channel qualities in the K channel qualities that are corresponding to the K1 antenna port groups respectively, K2 channel qualities consist of channel qualities in the K channel qualities that do not belong to the K1 channel qualities, and the K2 is equal to the K minus the K1; the K2 channel qualities comprise at least one second given channel quality, a difference between the second given channel quality and a second channel quality is related to a first-type numerical value corresponding to the second given channel quality, and the second channel quality is a channel quality in the K2 channel qualities that is not equal to the second given channel quality; or, K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

15. The UE device according to claim 11, comprising:
a first receiver module, to receive downlink information;
wherein the downlink information is used for determining at least one of {the K, the K1}.

16. A base station device for wireless communication, comprising:
a second receiver module, to receive first information;
wherein the first information comprises at least the former two of {K first-type indexes, K1 first-type indexes, K first-type numerical values}, and the K1 first-type indexes are a subset of the K first-type indexes; the K first-type indexes are used for determining K antenna port groups respectively, and one antenna port group comprises a positive integer number of antenna ports; the transmitter of the first information can receive simultaneously radio signals coming from K1 antenna port groups, the K1 antenna port groups are a subset of the K antenna port groups, and the K1 first-type indexes are used for determining the K1 antenna port groups respectively; the K first-type numerical values are used for determining K channel qualities respectively, and the K channel qualities are one-to-one corresponding to the K antenna port groups; the K1 first-type indexes comprise at least one given first-type index, and a position of the given first-type index in the K first-type indexes is used for determining whether an antenna port group corresponding to the given first-type index belongs to the K1 antenna port groups; and the K is a positive integer greater than 1, and the K1 is a positive integer greater than 1 but not greater than the K.

17. The base station device according to claim 16, comprising:
a second transmitter module, to transmit M reference signals;
wherein the M reference signals are transmitted by M antenna port groups respectively, the K antenna port groups are a subset of the M antenna port groups, and the M is a positive integer not less than the K.

18. The base station device according to claim 16, wherein the K channel qualities comprise at least one first given channel quality, a difference between the first given channel quality and a first channel quality is related to a first-type numerical value corresponding to the first given channel quality, and the first channel quality is a channel quality in the K channel qualities that is not equal to the first given channel quality; or, the K first-type numerical values are arranged in order.

19. The base station device according to claim 18, wherein the first channel quality is one channel quality of K1 channel qualities, the K1 channel qualities are channel qualities in the K channel qualities that are corresponding to the K1 antenna port groups respectively, K2 channel qualities consist of channel qualities in the K channel qualities that do not belong to the K1 channel qualities, and the K2 is equal to the K minus the K1; the K2 channel qualities comprise at least one second given channel quality, a difference between the second given channel quality and a second channel quality is related to a first-type numerical value corresponding to the second given channel quality, and the second channel quality is a channel quality in the K2 channel qualities that is not equal to the second given channel quality; or, K1 first-type numerical values and K2 first-type numerical values are arranged in order respectively, the K1 first-type numerical values and the K2 first-type numerical values are subsets of the K first-type numerical values respectively, the K1 first-type numerical values are one-to-one corresponding to the K1 channel qualities, and the K2 first-type numerical values are one-to-one corresponding to the K2 channel qualities.

20. The base station device according to claim 16, comprising:
a second transmitter module, to transmit downlink information;

wherein the downlink information is used for determining at least one of {the K, the K1}.

* * * * *